US012681862B2

(12) United States Patent
Wasef et al.

(10) Patent No.: US 12,681,862 B2
(45) Date of Patent: Jul. 14, 2026

(54) SYSTEMS AND METHODS FOR IDENTIFYING REGIONS OF A MEMORY DEVICE

(71) Applicant: Samsung Electronics Co., Ltd., Suwon-si (KR)

(72) Inventors: Michael Wasef, San Jose, CA (US); Andrew Chang, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/772,045

(22) Filed: Jul. 12, 2024

(65) Prior Publication Data

US 2025/0284641 A1     Sep. 11, 2025

Related U.S. Application Data

(60) Provisional application No. 63/561,504, filed on Mar. 5, 2024.

(51) Int. Cl.
    *G06F 12/0862* (2016.01)
    *G06F 3/06* (2006.01)
(52) U.S. Cl.
    CPC ........ *G06F 12/0862* (2013.01); *G06F 3/0604* (2013.01); *G06F 3/0655* (2013.01); *G06F 3/0679* (2013.01); *G06F 2212/602* (2013.01)
(58) Field of Classification Search
    CPC .......... G06F 12/0862; G06F 2212/602; G06F 12/1027; G06F 2212/1024; G06F 2212/507; G06F 2212/6024; G06F 2212/654
    See application file for complete search history.

(56) References Cited

U.S. PATENT DOCUMENTS

| | | | |
|---|---|---|---|
| 6,910,106 B2 | 6/2005 | Sechrest et al. | |
| 7,689,761 B2 | 3/2010 | Yim et al. | |
| | (Continued) | | |

FOREIGN PATENT DOCUMENTS

| | | |
|---|---|---|
| CN | 101853303 A | 10/2010 |
| CN | 107391034 B | 5/2019 |
| | (Continued) | |

OTHER PUBLICATIONS

Abts, D., et al., "Age-Based Packet Arbitration in Large-Radix k-ary n-cubes," SC '07: Proceedings of the 2007 ACM/IEEE Conference on Supercomputing, Reno, NV, USA, Jan. 8, 2010, pp. 1-11, https://ieeexplore.ieee.org/document/5348862.

(Continued)

*Primary Examiner* — Jane W Benner
(74) *Attorney, Agent, or Firm* — Womble Bond Dickinson (US) LLP

(57)     ABSTRACT

Systems and methods for identifying regions of a memory device are disclosed. A storage device comprises a first storage medium, a second storage medium, and a processor configured to: identify a first memory address; identify a first region of the first storage medium based on the first memory address; identify a first criterion associated with the first memory address; based on identification of the first criterion, identify a portion of the first region based on the first memory address; identify a second criterion associated with the portion; and retrieve data associated with the portion from the first storage medium to the second storage medium based on identification of the second criterion.

18 Claims, 17 Drawing Sheets

(56) References Cited

U.S. PATENT DOCUMENTS

| | | | |
|---|---|---|---|
| 8,838,931 B1 | 9/2014 | Marshak et al. | |
| 8,838,935 B2 | 9/2014 | Hinton et al. | |
| 8,935,493 B1 | 1/2015 | Dolan et al. | |
| 9,026,765 B1 | 5/2015 | Marshak et al. | |
| 9,189,407 B2 | 11/2015 | Zeidner et al. | |
| 9,251,056 B2 | 2/2016 | Fang et al. | |
| 9,582,199 B2 | 2/2017 | Ranjith Reddy et al. | |
| 10,073,656 B2 | 9/2018 | Zhe Yang et al. | |
| 10,095,624 B1 | 10/2018 | Visvanathan et al. | |
| 10,387,318 B2 | 8/2019 | Hooker et al. | |
| 10,387,320 B2 | 8/2019 | Brekelbaum et al. | |
| 10,742,399 B2 | 8/2020 | Chen et al. | |
| 11,321,636 B2 | 5/2022 | Hsu et al. | |
| 11,829,627 B2 | 11/2023 | Roberts et al. | |
| 2010/0115206 A1 | 5/2010 | de la Iglesia et al. | |
| 2014/0379995 A1 | 12/2014 | Kwon et al. | |
| 2015/0106578 A1 | 4/2015 | Warfield et al. | |
| 2016/0054997 A1 | 2/2016 | Radhakrishnan et al. | |
| 2017/0010970 A1 | 1/2017 | Chou | |
| 2017/0091104 A1 | 3/2017 | Rafacz et al. | |
| 2018/0173631 A1 | 6/2018 | Sartorius et al. | |
| 2019/0370632 A1 | 12/2019 | Hashemi et al. | |
| 2020/0371942 A1 | 11/2020 | Anastasiev et al. | |
| 2021/0019069 A1 | 1/2021 | Sen et al. | |
| 2022/0019530 A1 | 1/2022 | Roberts | |
| 2022/0050722 A1 | 2/2022 | Dugast et al. | |
| 2022/0058132 A1 | 2/2022 | Roberts et al. | |
| 2022/0222511 A1 | 7/2022 | Sharma et al. | |
| 2022/0342578 A1 | 10/2022 | Chen et al. | |
| 2023/0185572 A1 | 6/2023 | Licht et al. | |
| 2023/0205699 A1* | 6/2023 | Sha | G06F 12/0811 711/137 |
| 2023/0222065 A1 | 7/2023 | Reed et al. | |
| 2023/0315452 A1* | 10/2023 | Constable | G06F 12/0862 712/207 |
| 2024/0385966 A1* | 11/2024 | Li | G06F 12/0862 |

FOREIGN PATENT DOCUMENTS

| | | | |
|---|---|---|---|
| CN | 112799589 A | 5/2021 | |
| CN | 116991476 A | 11/2023 | |
| KR | 10-2031490 B1 | 10/2019 | |
| WO | WO 2023/045492 A1 | 3/2023 | |
| WO | WO 2023/061567 A1 | 4/2023 | |
| WO | WO 2023/061569 A1 | 4/2023 | |

OTHER PUBLICATIONS

Hasan, Maruf, et al., "Practical Memory Disaggregation," Diss. University of Michigan Library, 2023, 172 pages, https://deepblue.lib.umich.edu/handle/2027.42/177792.

Staelin, Carl Hudson, "High-performance file system design," Princeton University, 1991, 99 pages, https://www.cs.princeton.edu/research/techreps/TR-347-91.

Zhang, Teng, et al., "SA-LSM: Optimize Data Layout for LSM-tree Based Storage using Survival Analysis," Proceedings of the VLDB Endowment 15.10, Jun. 1, 2022, pp. 2161-2174, https://dl.acm.org/doi/abs/10.14778/3547305.3547320.

T. Mohan, B. R. de Supinski, S. A McKee, F. Mueller, A Yoo and M. Schulz, "Identifying and Exploiting Spatial Regularity in Data Memory References," SC '03: Proceedings of the 2003 ACM/IEEE Conference on Supercomputing, Phoenix, AZ, USA, 2003, pp. 49-49 (Year: 2003).

US Office Action dated Aug. 6, 2025, issued in U.S. Appl. No. 18/772,039 (14 pages).

US Office Action dated Nov. 12, 2025, issued in U.S. Appl. No. 18/772,031 (21 pages).

US Final Office Action dated Nov. 24, 2025, issued in U.S. Appl. No. 18/772,039 (15 pages).

US Office Action dated Mar. 12, 2026, issued in U.S. Appl. No. 18/772,039 (14 pages).

US Final Office Action dated Apr. 3, 2026, issued in U.S. Appl. No. 18/772,031 (24 pages).

\* cited by examiner

SYSTEMS AND METHODS FOR IDENTIFYING REGIONS OF A MEMORY DEVICE

CROSS-REFERENCE TO RELATED APPLICATION(S)

The present application claims priority to and the benefit of U.S. Provisional Application No. 63/561,504, filed Mar. 5, 2024, entitled "RUN-TIME HOT REGION DETECTION WITH NONE SEQUENTIAL ACCESS FOR EFFECTIVE PREFETCHING," the entire content of which is incorporated herein by reference. The present application also is related to U.S. application Ser. No. 18/772,031, filed Jul. 12, 2024, entitled "SYSTEMS AND METHODS FOR GROUPING MEMORY ADDRESSES", and U.S. application Ser. No. 18/772,039, filed Jul. 12, 2024, entitled "SYSTEMS AND METHODS FOR PATTERN RECOGNITION", the content of both of which are incorporated herein by reference.

FIELD

One or more aspects of embodiments according to the present disclosure relate to memory devices, and more particularly, to systems and methods for identifying regions of a memory device for making prefetching decisions.

BACKGROUND

An application running on a host computing device may need to read and write data to memory. As the amount data read and written to memory increases, the demand for storage devices and memory, and efficiently accessing the storage devices and memory, may also increase.

The above information disclosed in this Background section is only for enhancement of understanding of the background of the present disclosure, and therefore, it may contain information that does not form prior art.

SUMMARY

Embodiments of the present disclosure are directed to a storage device that includes a first storage medium; a second storage medium; a processor configured to: identify a first memory address; identify a first region of the first storage medium based on the first memory address; identify a first criterion associated with the first memory address; based on identification of the first criterion, identify a portion of the first region based on the first memory address; identify a second criterion associated with the portion; and retrieve data associated with the portion from the first storage medium to the second storage medium based on identification of the second criterion.

In one embodiment, the first criterion includes the first memory address being a threshold distance away from a second memory address.

In one embodiment, the portion of the first region is associated with a range of memory addresses.

In one embodiment, the processor is configured to: identify a second memory address of the range of memory addresses satisfying a third criterion; identify a third memory address of the range of memory addresses satisfying a fourth criterion; and retrieve data between the second memory address and the third memory address.

In one embodiment, the processor is further configured to: update a counter associated with the portion based on access of the first memory address.

In one embodiment, the second criterion includes the counter being greater than a threshold value.

In one embodiment, the processor is further configured to: maintain a list of identified portions; determine a number of the identified portions in the list; determine that the number of the identified portions is less than a threshold number; and add the portion to the list based on the number of the identified portions being less than the threshold number.

In one embodiment, the processor being configured to retrieve the data is based on the portion being added to the list.

In one embodiment, the processor is further configured to: detect a condition; based on detecting the condition, identify a third criterion associated with the portion; and based on identifying the third criterion, remove the portion from the list.

In one embodiment, the third criterion is based on an access of an address associated with the portion.

Embodiments of the present disclosure are also directed to a method comprising: identifying a first memory address; identifying a first region of a first storage medium based on the first memory address; identifying a first criterion associated with the first memory address; based on identification of the first criterion, identifying a portion of the first region based on the first memory address; identifying a second criterion associated with the portion; and retrieving data associated with the portion from the first storage medium to a second storage medium based on identification of the second criterion.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
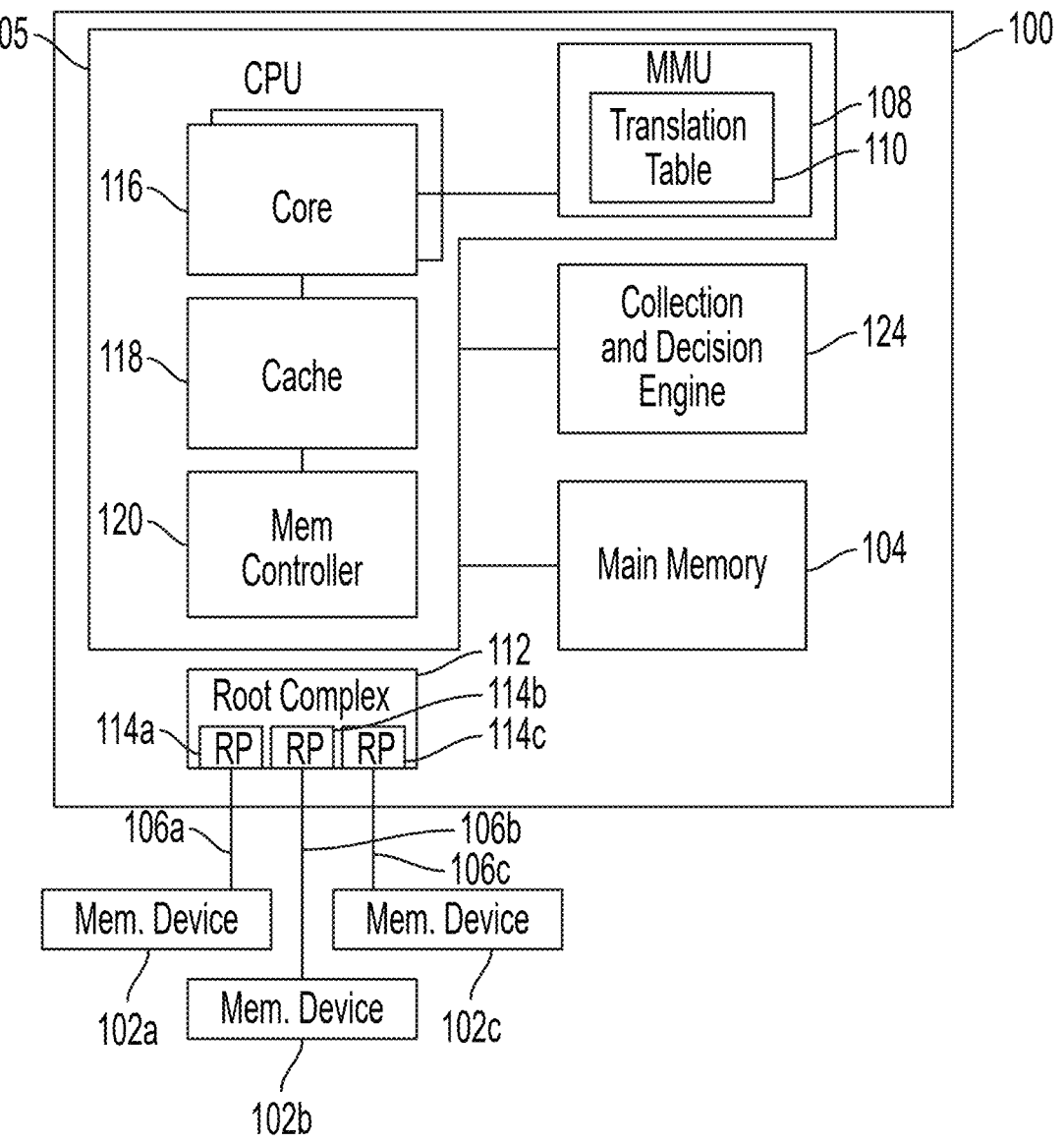
FIG. 1 depicts a block diagram of a system for adaptive clustering according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

Applications may perform computations of large amounts of data. As such types of computations increase, the demand for memory may also increase. Memory expansion technologies may help alleviate this problem by providing tiered memory subsystems that help increase memory capacity at a lower cost. The memory subsystem may include, for example, a memory device that adheres to a Compute Express Link (CXL) protocol. The memory device may include a volatile memory (e.g., a dynamic random access memory (DRAM)) and a non-volatile memory (NVM).

An application running on the host device may read and write data to the memory device via load and store commands, treating the memory device as an expansion of the main memory that is attached to the processor. Latencies are generally involved in accessing the memory device. The latencies involved may differ depending on the storage medium storing the data that is to be retrieved. For example, the memory device may have both a volatile storage medium (e.g., dynamic random access memory (DRAM)) and a non-volatile storage medium (e.g., NAND flash memory). The latencies of the volatile storage medium may be lower than the latencies of the non-volatile storage medium. It may be desirable to use the volatile storage medium as cache memory where a block, chunk, or page of data (collectively referred to as a "page") that is anticipated to be accessed soon, may be moved (e.g., prefetched) to the cache memory to minimize a cache miss that will result in access of the non-volatile storage medium.

A prefetching algorithm may be used to identify the data that is to be prefetched to the cache memory. The prefetching algorithm may predict access or temperature of the page in making the prefetching decision. For example, preference may be given to more accessed or "hot" pages than less accessed or "cold" pages, for determining the pages that are to be prefetched into the cache memory. A heat map of the application may be generated for assessing page temperature. The heat map, however, is typically generated offline. Applying an offline-generated heat map at run-time may pose a challenge due to the overhead introduced in translating the virtual addresses included in the heat map, to physical addresses.

In general terms, embodiments of the present disclosure are directed to systems and methods for using a two-level clustering model for adaptively grouping physical memory addresses accessed by a host. The two-level clustering model may include a cluster at a first level, and one or more active regions of the cluster at a second level. Access of memory addresses grouped into different active regions may be monitored by the memory device for making prefetching decisions.

In some embodiments, random jumps to an active region of the memory device are monitored to determine whether a sub-region of the active region may be promoted as a hot region. In some embodiments, data associated with the hot region is prefetched from the non-volatile storage medium to the cache memory to improve a hit rate of the memory device. The hot region may be evaluated on a periodic basis to determine whether the region may maintain its hot region status. If the region no longer qualifies as a hot region, the region may be demoted to a regular memory region status.

In some embodiments, the selection of a cluster or active region to which an accessed physical memory address is to be grouped may depend on the distance between the accessed address and the address of the center of the cluster or the center of the active region. In some embodiments, as addresses are added to the cluster, the center of the cluster may adjust.

In some embodiments, one or more counters and/or parameters are maintained for the clusters and active regions. The counters and/or parameters may be updated as physical memory addresses are added to the clusters and active regions. For example, an activity level of an active region may be updated based on accesses of memory addresses associated with the active regions (simply referred to as access of the active regions). In some embodiments, the activity level assigned to an active region determines an amount of prefetching requests that may be processed for the region.

In some embodiments, an evaluation task is executed periodically to delete active regions that have become inactive. The evaluation task may also be configured to compute a score of remaining active regions for demoting or promoting the active regions to different activity levels. The demotion or promotion of active regions may be based on a number and timing of accesses of the active region, hit or miss ratios, and/or the like.

In some embodiments, the accesses to an active region are analyzed for determining an access profile. The access profile may indicate, for example, whether the accesses are continuous or sequential, whether the accesses have a pattern, whether the accesses are random jumps to a hot region, and/or the like. Details on systems and methods for detecting patterns of memory accesses are described in further detail in [[251935]], filed on even date herewith, the content of which is incorporated herein by reference.

Accesses of addresses associated with the active region (simply referred to as accesses of the active region) may include random or non-uniform jumps to the active region. The jumps to the active region may not follow an access pattern. Although the jump accesses may be random, there may be a high number (e.g., higher than a threshold number) of such accesses to a portion or sub-region of the active region. Prefetching data from the highly accessed addresses may help improve the hit rate of the memory device.

In some embodiments, a hot region recommendation algorithm (hereinafter referred to as a hot region recommender) is configured to identify a memory access that results in a jump to a sub-region of an active region. A jump may be detected if a difference between a currently accessed memory or page address (used interchangeably herein) and a last accessed address is bigger than a threshold. Based on the jumps (e.g., the number of jumps) to the sub-region, the hot region recommender may determine that the sub-region should be identified (e.g., promoted) as a hot region.

In some embodiments, an active region may have a maximum number of sub-regions (e.g., 5 sub-regions) that may be monitored by the hot region recommender for promoting as a hot region. One or more parameters of the sub-regions may be maintained in a sub-region recommender array. The one or more parameters may include, for example, an address stamp (e.g., a range of pages in the active region) associated with the sub-region, a smallest page address accessed within the range, a biggest page address accessed within the range, and a counter of a number of jumps associated with the range.

In some embodiments, the hot region recommender selects a monitored sub-region for promoting as a hot region. The selection may be based on the counter value that tracks the number of jumps to the range of pages associated with the sub-region that exceeds a threshold value. Once promoted as a hot region, the hot region recommender may transmit a command for prefetching a range of memory addresses associated with the promoted sub-region. The prefetching of data in the page ranges associated with the promoted sub-region may help minimize the miss rate that could otherwise occur due to non-uniform jumps to the sub-region.

In some embodiments, a maximum number of sub-regions across the various active regions may be identified as hot regions. For example, a maximum of 7 or 8 sub-regions may be identified as hot regions at a given time. In some embodiments, a hot region evaluation algorithm (referred to as a hot region evaluator) is configured to monitor the hot regions on a periodic (regular or irregular) basis. The evaluation may include determining a time of last access to the hot region. The hot region evaluator may demote the hot region in response to determining that a threshold amount of time has elapsed since the region was accessed last. For example, a hot region that has not been accessed since a last evaluation period may be demoted to a regular sub-region, and removed from a hot region array.

In some embodiments, the hot region evaluator is configured to weigh the accesses to the hot region based on a time value. For example, a higher weight to newer accesses of the hot region than to older accesses. In some embodiments, the hot regions may be ranked based on the weighed number of accesses. In this regard, a hot region with a smallest weighed number of accesses may be replaced with a sub-region with a higher weighed number of accesses that may be waiting to be added to the hot region array.

FIG. 1 depicts a block diagram of a system for adaptive clustering according to one or more embodiments. The system includes a host computing device (referred to as the "host") 100 coupled to a one or more endpoints such as, for example, one or more memory devices 102a-102c (collectively referenced as 102).

The host 100 includes, without limitation, a processor 105, main memory 104, and root complex (RC) interface 112. The processor 105 may include one or more central processing unit (CPU) cores 116 configured to execute computer program instructions and process data stored in a cache memory (simply referred to as "memory" or "cache") 118. The cache 118 may be dedicated to one of the CPU cores 116 or shared by various ones of the CPU cores. It should be appreciated that although a CPU is used to describe the various embodiments, a person of skill in the art will recognize that a GPU or other computing unit may be used in lieu or in addition to a CPU.

The cache 118 may be coupled to a memory controller 120 which in turn is coupled to the main memory 104. The main memory 104 may include, for example, a dynamic random access memory (DRAM) storing computer program instructions and/or other types of data (collectively referenced as data) similar to the memory device 102. In order for a CPU core 116 to execute instructions or retrieve data provided by the memory device 102, the corresponding data may be loaded into the cache memory 118, and the CPU core may consume the data (e.g., directly) from the cache memory. If the data to be consumed is not already in the cache, a cache miss may occur, and the memory device 102 may need to be queried to load the data. For example, if the data to be consumed is not in the cache 118, a cache miss logic may query the data from memory (e.g., main memory (e.g., DRAM) 104 or memory device 102) based on a mapped virtual or physical address.

In some embodiments, the processor 105 (e.g., an application running on the processor) generates data access requests for the memory devices 102. Multiple applications may be executed by the processor 105 at a given time. The multiple applications may generate numerous data access requests to the memory devices 102. One or more of the data access requests may include a virtual memory address of a location to write or read data. The processor 105 may invoke a memory management unit (MMU) 108 to translate the virtual address to a physical address for processing the request. The MMU 108 may include a translation table 110 that maps virtual addresses to physical addresses. The request transmitted to the memory device 102 for fulfilling the data access request may include the physical address corresponding to the virtual address.

In some embodiments, the host 100 exchanges signals or messages with the memory devices 102 via the RC interface 112 and interface connections 106a-106c (collectively referenced as 106). For example, the host 100 may transmit a request (e.g., a load or store request) over the RC interface 112 and interface connections 106 for reading or writing data from or to the memory devices 102. Messages from the memory devices 102 to the host 100, such as, for example, responses to the requests from the host, may be delivered over the interface connections 106 to the RC interface 112, which in turn delivers the responses to the processor 105. The memory devices 102 may further transmit signals including, for example, certain types of notifications, to the host 100 over the RC interface 112 and interface connections 106.

In some embodiments, the interface connections 106 (e.g., the connector and the protocol thereof) include a memory expansion bus such as, for example, a Compute Express Link (CXL), although embodiments are not limited thereto. For example, the interface connections 106 (e.g., the connector and the protocol thereof) may also include a general-purpose interface such as, for example, Ethernet, Universal Serial Bus (USB), and/or the like. In some embodiments, the interface connections 106 may include (or may conform to) a Cache Coherent Interconnect for Accelerators (CCIX), dual in-line memory module (DIMM) interface, Small Computer System Interface (SCSI), Fiber Channel, Serial Attached SCSI (SAS), iWARP protocol, InfiniBand protocol, 5G wireless protocol, Wi-Fi protocol, Bluetooth protocol, and/or the like.

The RC interface 112 may be, for example, a CXL interface configured to implement a root complex for connecting the processor 105 and main memory 104 to the memory devices 102. The RC interface 112 may include one or more ports 114a-114c to connect the one or more memory devices 102 to the RC. In some embodiments, the MMU 108 and/or translation table 110 may be integrated into the RC 112 interface for allowing the address translations to be implemented by the RC interface.

The memory device 102 may include one or more of a volatile computer-readable storage medium and/or non-volatile computer-readable storage medium. In some embodiments, one or more of the memory devices 102 include memory that is attached to a CPU or GPU, such as, for example, a CXL attached memory device (including volatile and persistent memory device), RDMA attached memory device, and/or the like, although embodiments are not limited thereto. The CXL attached memory device (simply referred to as CXL memory) may adhere to a CXL.mem protocol where the host 100 may access the memory using commands such as load and store commands. In this regard, the host 100 may act as a requester and the CXL memory may act as a subordinate.

In some embodiments, the memory devices 102 are included in a memory system that allows memory tiering to deliver an appropriate cost or performance profile. In this regard, the different types of storage media may be organized in a memory hierarchy or tier based on a characteristic of the storage media. The characteristic may be access latency. In some embodiments, the tier or level of a memory device increases as the access latency decreases.

In some embodiments, the one or more of the memory devices 102 are memory devices of the same or different type, that are aggregated into a storage pool. For example, the storage pool may include one or more CPU or GPU attached memory devices.

Figure 2:
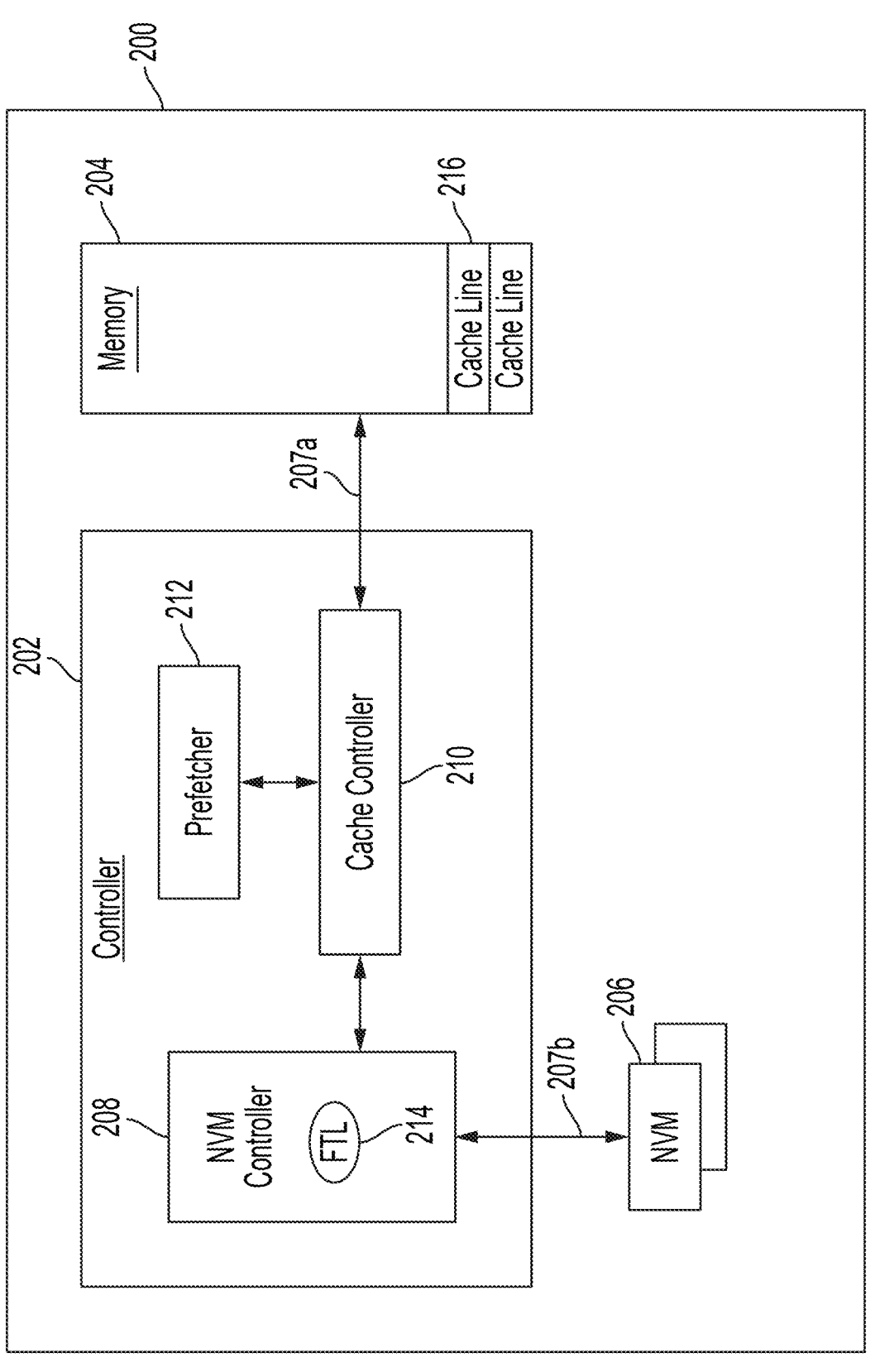
FIG. 2 depicts a block diagram of a memory device according to one or more embodiments.

FIG. 2 depicts a block diagram of a memory device 200 according to one or more embodiments. The memory device 200 may be similar to the one or more memory devices 102 of FIG. 1. In some embodiments, the memory device 200 includes a storage controller 202, storage memory 204, and non-volatile memory (NVM) 206. The storage memory 204 may be high-performing memory of the memory device 200, and may include (or may be) volatile memory, for example, such as DRAM, but the present disclosure is not limited thereto, and the storage memory 204 may be any suitable kind of high-performing volatile or non-volatile memory. Although a single storage memory 204 is depicted for simplicity sake, a person of skill in the art should recognize that the memory device 200 may include other local memory for temporarily storing other data for the storage device.

In some embodiments, the storage memory 204 is used and managed as cache memory. In this regard, the storage memory (also referred to as a device cache memory) 204 may store copies of data stored in the NVM 206. For example, data that is to be accessed by an application in the host 100 in the near future may be copied from the NVM 206 to the storage memory 204 for allowing the data to be retrieved from the storage memory 204 instead of the NVM 206. In some embodiments, the storage memory 204 has a lower access latency than the NVM 206. Thus, in some embodiments, accessing data from the storage memory 204 helps improve overall system performance and responsiveness.

The NVM 206 may persistently store data received, for example, from the host 100. The NVM 206 may include, for example, one or more NAND flash memory, but the present disclosure is not limited thereto, and the NVM 206 may include any suitable kind of memory for persistently storing the data according to an implementation of the memory device 200 (e.g., magnetic disks, tape, optical disks, and/or the like).

The storage controller 202 may be connected to the NVM 206 and the storage memory 204 over one or more storage interfaces 207a, 207b (collectively referenced as 207). The storage controller 202 may receive input/output (I/O) requests (e.g. load or store requests) from the host 100, and transmit commands to and from the NVM 206 and/or storage memory 204 for fulfilling the I/O requests. In this regard, the storage controller 202 may include at least one processing component embedded thereon for interfacing with the host 100, the storage memory 204, and the NVM 206. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 204 or NVM 206 according to the data access instructions.

In some embodiments, the storage controller 202 includes an NVM controller 208, cache controller 210, and prefetch engine 212 (also referred to as a prefetcher). Although the NVM controller 208, cache controller 210, and prefetch engine 212 are assumed to be separate components, a person of skill in the art will recognize that one or more of the components may be combined or integrated into a single component, or further subdivided into further sub-components without departing from the spirit and scope of the inventive concept.

In some embodiments, the NVM controller 208, cache controller 210, and/or prefetch engine 212 may include, for example, a digital circuit (e.g., a microcontroller, a microprocessor, a digital signal processor, or a logic device (e.g., a field programmable gate array (FPGA), an application-specific integrated circuit (ASIC), and/or the like (collectively referenced as a processor)). The digital circuit may include a memory storing instructions (e.g., software, firmware, and/or hardware code) for being executed by the processor.

In some embodiments, the NVM controller 208 is configured to receive data access requests from the host 100. The data access requests may adhere to the CXL protocol (e.g., the CXL.io, CXL.mem, and/or CXL.cache protocol). In some embodiments, the NVM controller 208 includes a flash translation layer (FTL) 214 that receives the data access request and interfaces with the NVM 206 to read data from, and write data to, the NVM. In this regard, the FTL 214 may translate a physical address included in the data access request, to a flash block address. In doing so, the FTL 214 may engage in wear leveling to move data around the storage cells of the NVM 206 to evenly distribute the writes to the NVM 206.

In some embodiments, the prefetch engine 212 is configured to monitor memory requests from the host 100, and anticipate next requests. The data associated with the anticipated next requests may be prefetched into the device cache memory 204 for increasing the hit rate or, conversely, for minimizing the miss rate. In some embodiments, the prefetch engine 212 is configured to group the physical memory addresses of the memory requests into one or more regions (referred to as clusters) and sub-regions (referred to as active regions), using a two-level adaptive clustering model. The prefetch engine 212 may monitor the active regions for an amount of activity. The active regions may be promoted, demoted, or deleted, based on access profiles determined for the regions.

In some embodiments, data is prefetched into the device cache memory 204 based on the access profiles of the active regions. In some embodiments, the prefetch engine 212 communicates with the cache controller 210 for retrieving the data that is stored in the memory address that is to be prefetched. In some embodiments, the cache controller 210 or the FTL 214 is configured to translate a requested memory block address into a flash block address. The NMV controller 208 may retrieve the data from the flash block address, and forward the data to the cache controller 210. The cache controller 210 may select a cache address (e.g., a cache line 216) of the device cache memory 204, and store the data into the cache address.

Figure 3:
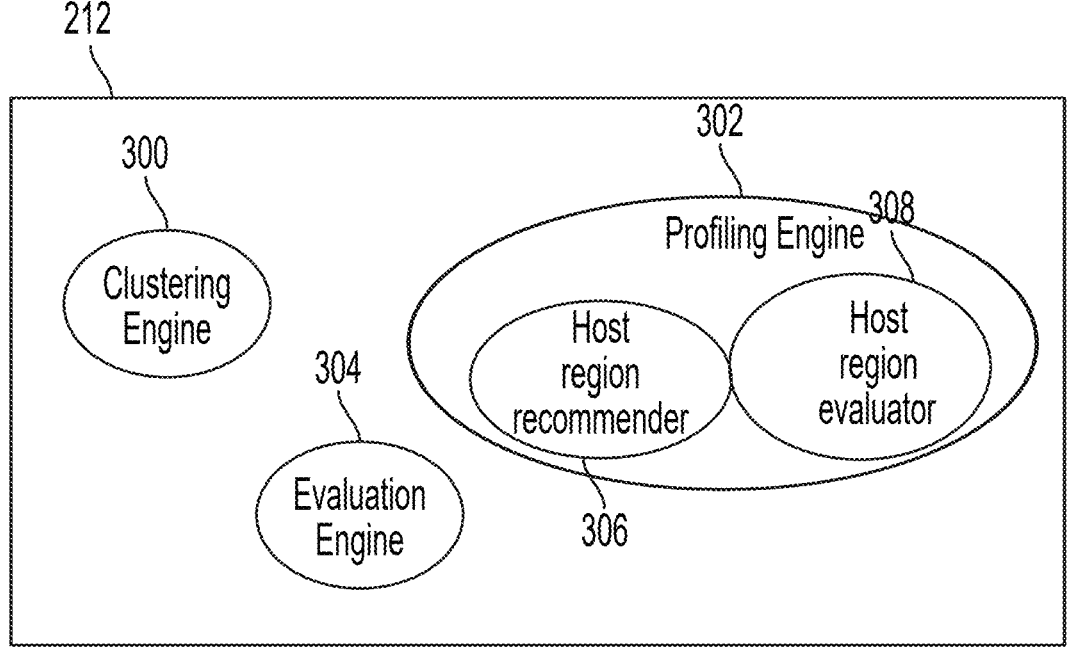
FIG. 3 depicts a block diagram of a prefetch engine according to one or more embodiments.

FIG. 3 depicts a block diagram of the prefetch engine 212 according to one or more embodiments. The prefetch engine 212 may include a clustering engine 300, profiling engine 302, and evaluation engine 304. Although the clustering engine 300, profiling engine 302, and evaluation engine 304 are assumed to be separate components, a person of skill in the art will recognize that one or more of the components may be combined or integrated into a single component, or further subdivided into further sub-components without departing from the spirit and scope of the inventive concept.

In some embodiments, the clustering engine 300 is configured to identify an address of a data access request (e.g., a load request) from an application running on the host 100, and identify an existing cluster or generate a new cluster for the address according to a first level of the clustering model. The size of the cluster may be preset (e.g., 8 GB). The address may be associated or grouped into an existing cluster if the address is within a range of addresses associated with the cluster. The range of addresses may be the addresses of the NVM 206. A new cluster may be generated centered around the address if the address cannot be grouped into an existing cluster.

For a second level of the clustering model, the clustering engine 300 may identify an existing active region within an identified cluster, or create a new active region. The initial size of the active region may be preset (e.g., 8 MB). The address may be associated or grouped into an existing active region if the address is within a range of addresses associated with the active region. The range of addresses may be the addresses of the NVM 206. A new active region may be generated centered around the address if the address cannot be grouped into an existing active region. The new active region may be associated with a default activity level (e.g., the lowest activity level). The activity level may change based on tracked activity of the active region. The size of the active region may also change based on changes to the activity level.

In some embodiments, one of the clustering engine 300, profiling engine 302, and/or evaluation engine 304 is configured to monitor or track activity of the clusters and/or active regions. One or more counters or parameter values (collectively referenced as counters) may be updated based on the monitored activity. For example, requests for memory addresses associated with the clusters and/or active regions may be monitored for updating counters relating to a number of accesses per cluster, a number of accesses per active region, last access time per active region, a number of misses per active region, a number of hits per active region, and/or the like.

In some embodiments, the profiling engine 302 is configured to generate access profiles for the active regions based on the tracked activities. The access profile may indicate, for example, whether the accesses are continuous or sequential, whether the accesses have a pattern, whether the accesses are random jumps to a hot region, and/or the like.

In some embodiments, the profiling engine 302 is configured to identify non-uniform jump accesses to sub-regions of an active region for determining whether the sub-regions should be promoted as hot regions. In this regard, the profiling engine 302 includes a hot region recommender 306 and a hot region evaluator 308. The hot region recommender 306 may be configured to determine whether a difference between a currently accessed address and a last accessed address indicates a jump access. For example, a jump access may be detected if the difference is larger than a threshold value (e.g., a page size).

In some embodiments, the hot region recommender 306 identifies a portion (e.g., a sub-region) of the active region associated with the jump. The sub-region may be associated with a range of memory addresses (e.g., range of pages) in the active region. The range of memory addresses associated with a sub-region may be referred to as an address stamp.

In some embodiments, the hot region recommender 306 is configured to monitor up to a maximum number of sub-regions of an active region for determining whether one or more of the sub-regions should be identified as hot regions. The maximum number of sub-regions monitored by the hot region recommender may be, for example, five. In some embodiments, the hot region recommender 306 is configured to maintain one or more parameters of an identified sub-region. The one or more parameters may include, for example, the address stamp of the sub-region, a smallest page address accessed within the range of pages of the sub-region, a biggest page address accessed within the range, and a counter of a number of jumps associated with the range. In some embodiments the hot region recommender 306 determines whether the number of jumps tracked by the counter for a sub-region exceeds a threshold value. If the value of the counter exceeds the threshold value, the sub-region may be selected for being promoted as a hot region.

In some embodiments, whether a selected sub-region is promoted as a hot region depends on the number of hot regions already identified for the memory device. In some embodiments, the memory device maintains a maximum of 8 hot regions at a given time. Information about the hot regions are maintained in a hot region array.

In some embodiments, the hot region evaluator 308 is configured to evaluate the hot regions in the hot region array and determine whether the hot regions should remain as hot regions, or be demoted and removed from the hot region array. In this regard, the hot region recommender 306 or hot region evaluator 308 maintains and updates parameters for a hot region in the hot region array. The parameters may include, for example, an access counter and a hits counter. The access counter may indicate the number of times the sub-region was accessed (and the time of the access) since it was promoted as a hot region. The hits counter may indicate the number of accesses to addresses associated with the hot region that resulted in a cache hit.

In some embodiments, the hot region evaluator 308 monitors for a trigger event to conduct an evaluation of the hot regions of the hot region array. The trigger event may be, for example, passage of a certain amount of time since a last evaluation, a number of sub-regions waiting for promotion to a hot region, status of the memory device, and/or the like.

In some embodiments, an evaluation of a hot region includes determining an access time of a last access to a memory address associated with the hot region. The hot region evaluator 308 may demote the hot region in response to determining that the time of last access exceeds a threshold time. For example, a hot region associated with an address that has not been accessed since a last evaluation period may be demoted to a regular sub-region. A demoted sub-region may be removed from the array of hot regions.

In some embodiments, the hot region evaluator 308 is configured to consider one or more parameters for ranking the hot regions in the hot region array. For example, a time of the accesses to an address associated with a hot region may be considered for assigning a weight to the access. A higher weight may be assigned to a newer access than to an older access. For example, a hot region may have a weighted number of accesses that is lower than a weighted number of accesses of a recommended sub-region waiting for promotion. In this case, the hot region with the lower weighted number of accesses may be removed from the hot region array to make room for the recommended sub-region.

In another example, the number of cache hits recorded by the hits counter may be used for ranking the hot regions in the hot region array. In this regard, memory accesses to a first hot region may result in a higher number of cache hits than memory accesses to a second hot region. In this case, the first hot region may be ranked higher than the second hot region. In some embodiments, a hot region with a cache hit count below a threshold value is removed from the hot region array.

In some embodiments, data associated with a range of page addresses of a hot region in the hot region array are prefetched from the NVM 206 to the cache memory 204. In some embodiments, the range of memory addresses include page addresses between the biggest page address accessed within the page range, and the smallest page address accessed within the range. The prefetching of data in the page ranges associated with the hot region may help minimize the miss rate that could otherwise occur due to non-uniform jumps to the page ranges.

In some embodiments, whether data may be prefetched for a hot region depends on the activity level assigned to the active region to which the hot region belongs, in addition to other cache management considerations. In some embodiments, a certain allowance or credit to generate prefetch requests is provided to the active region based on the activity level of the active region. For example, an active region with the lowest activity level (e.g., activity level 1) may be allowed a lower amount of credit that an active region with the highest activity level (e.g., activity level 3).

In some embodiments, the evaluation engine 304 is configured to evaluate the active regions on a periodic (regular or irregular) basis. In some embodiments, the time of a last access to an active region may be examined during an evaluation period. The active region may be deleted upon detecting a criterion. The criterion may be lack of access to the active region for a period of time. For example, the active region may be deleted if there has been no access to the region for three evaluation periods, although embodiments are not limited thereto.

In some embodiments, the evaluation engine 304 is configured to promote or demote an active region from one activity level to another based on a score assigned to the active region. The score may be computed based on calculations performed using the counter values. The calculations may include, for example, a calculation (p1) of cluster populations, a calculation (p2) of the population of an active region, a miss ratio (p3) in the active region, and a calculation (p4) of a last access time ratio, as follows:

$$p1 = \text{cluster counter}/\text{global counter}$$
$$p2 = \text{active region counter}/\text{cluster counter}$$
$$p3 = \text{number of misses}/(\text{number of misses} + \text{number of hits})$$
$$p4 = \text{active region last access time}/\text{global counter}$$

where the global counter includes a count of requests to addresses associated with a cluster, and the active region counter includes a count of requests to addresses associated with the active region.

In some embodiments, a score for an active region is computed as a weighted aggregate of p1, p2, p3, and p4 as follows:

$$\text{score} = w1p1 + w2p2 + w3p3 + w4p4$$

A higher score may indicate higher activity in the active region. A threshold minimum score associated with an activity level may need to be achieved in order for the active region to be promoted or demoted to respectively a higher or lower activity level. In some embodiments, the total number of activity levels is three, although embodiments are not limited thereto. In some embodiments, the activity level assigned to an active region determines the allowance or credit of prefetch requests that may be processed for the active region.

Figure 4:
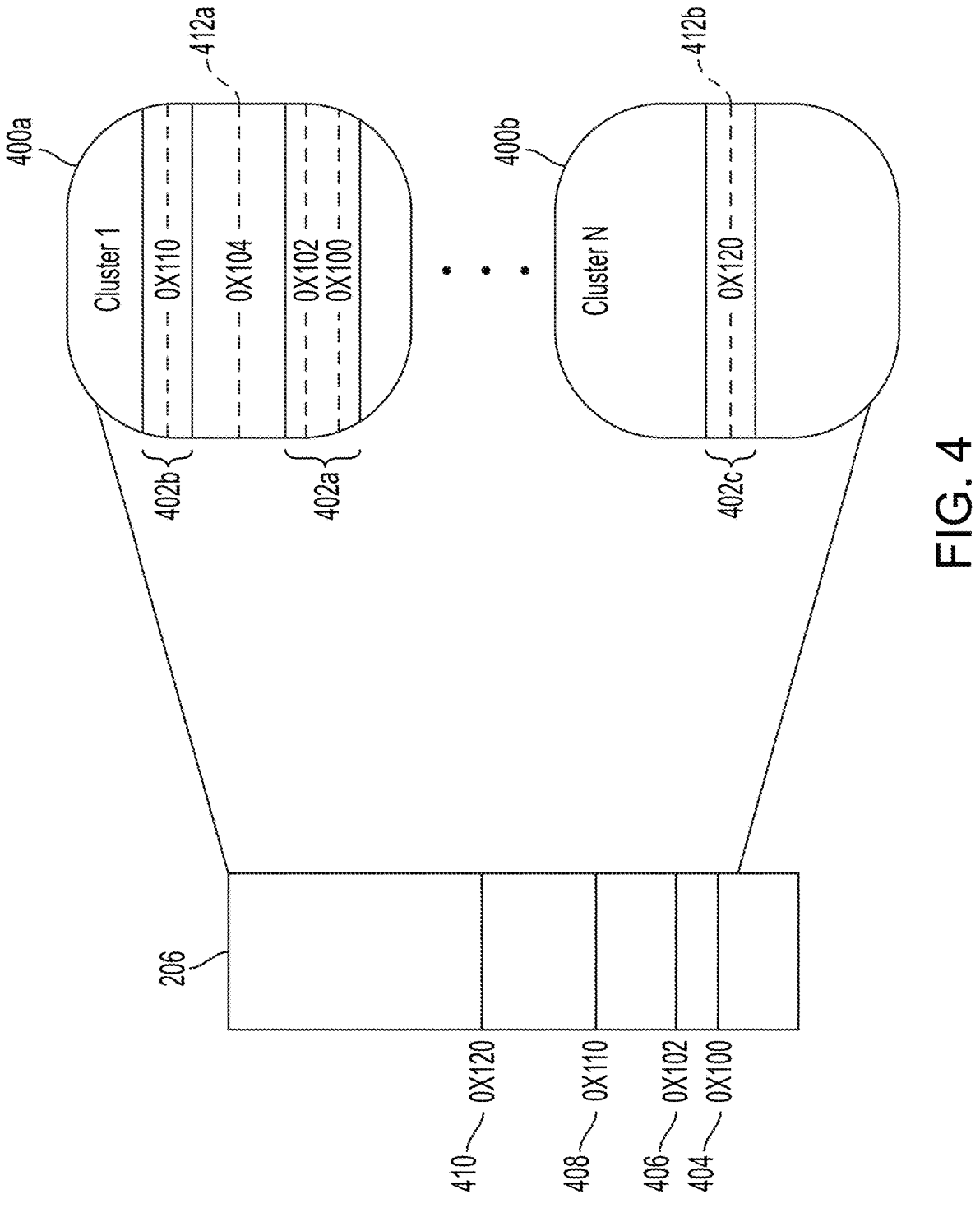
FIG. 4 depicts a conceptual block diagram of clusters and active regions according to one or more embodiments.

FIG. 4 depicts a conceptual block diagram of clusters 400a, 400b (collectively referenced as 400) and active regions (ARs) 402a-402c (collectively referenced as 402) according to one or more embodiments. The clusters 400 and active regions 402 may be generated based on addresses identified in the data access requests (e.g., load requests) from one or more applications running on the host 100. The clusters 400 may be of a fixed size (e.g., 8 GB), centered around a cluster center address (cluster center) 412a, 412b (collectively referenced as 412) of the respective cluster 400. The cluster center 412 may be updated as addresses are added to the cluster. In this manner, the addresses of the upper and lower boundaries of the cluster may adjust as new addresses are added, although the size of the cluster may remain fixed.

In some embodiments, the active regions 402 are initialized to a default size and centered around an active region (AR) center address (AR center) (not shown). The AR center may be updated as addresses are added to the active region 402. The size of the active regions may also be adjusted based on activities of the active regions. For example, an active region 402 with an increased activity level may be split into two or more active regions of reduced sizes.

In the example of FIG. 4, the first cluster 400a and the first active region 402a may be generated based on receipt of the first address 404. The second address 406 may belong to a range of addresses associated with the first active region 402a. Thus, the second address 406 may be associated with the first active region 402a upon receipt of a data access request including the second address 406.

The third address 408 may be inside the range of addresses associated with the first cluster 400a, but outside of the range of addresses associated with the first active region 402a. Thus, the second active region 402b may be created around the third address 408 upon receipt of a data access request for the third address.

The fourth address 410 may be outside of the range of addresses associated with the first cluster 400a. Thus, the second cluster 400b and the third active region 402c may be created around the fourth address 410 upon receipt of a data access request for the fourth address.

Figure 5:
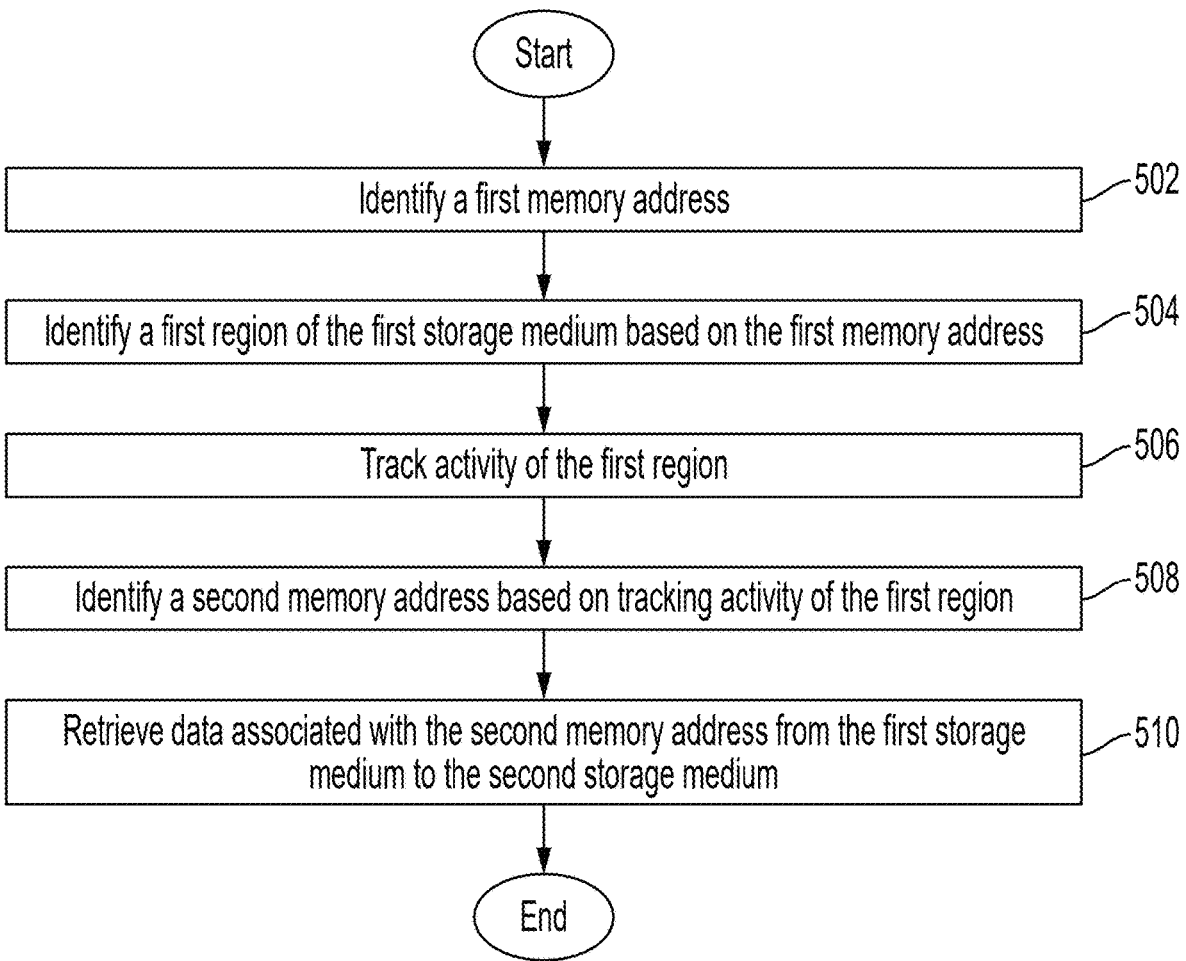
FIG. 5 depicts a flow diagram of a process for adaptive clustering for data prefetching according to one or more embodiments.

FIG. 5 depicts a flow diagram of a process for adaptive clustering for data prefetching according to one or more embodiments. The process starts, and in act 502, the clustering engine 300 identifies an address (e.g., a first memory address) of a data access request by an application running on the host 100.

For purposes of the example of FIG. 5, it is assumed that a cluster has been identified for the address. In act 504, the clustering engine 300 identifies an active region (e.g., a first region of a first storage medium) of the cluster based on the address. The active region may be an existing active region that encompasses the address, or a new active region generated based on the address. Whether an existing active region encompasses the address may be based on computing a difference between the address and an address (e.g., a third memory address) of the center of the active region.

In act 506, one of the clustering engine 300, profiling engine 302, and/or evaluation engine 304 tracks activity of the active region. In some embodiments, the profiling engine 302 generates an access profile based on the tracking of the activity.

In the event that the access profile indicates that prefetching is appropriate for an active region, the profiling engine 302 identifies, in act 508, a second memory address based on tracking activity of the first region.

In act 510, the prefetch engine 212 retrieves (e.g., prefetches) data associated with the second memory address from the first storage medium (e.g., the NVM 206) to a second storage medium (e.g., cache memory 204).

Figure 6:
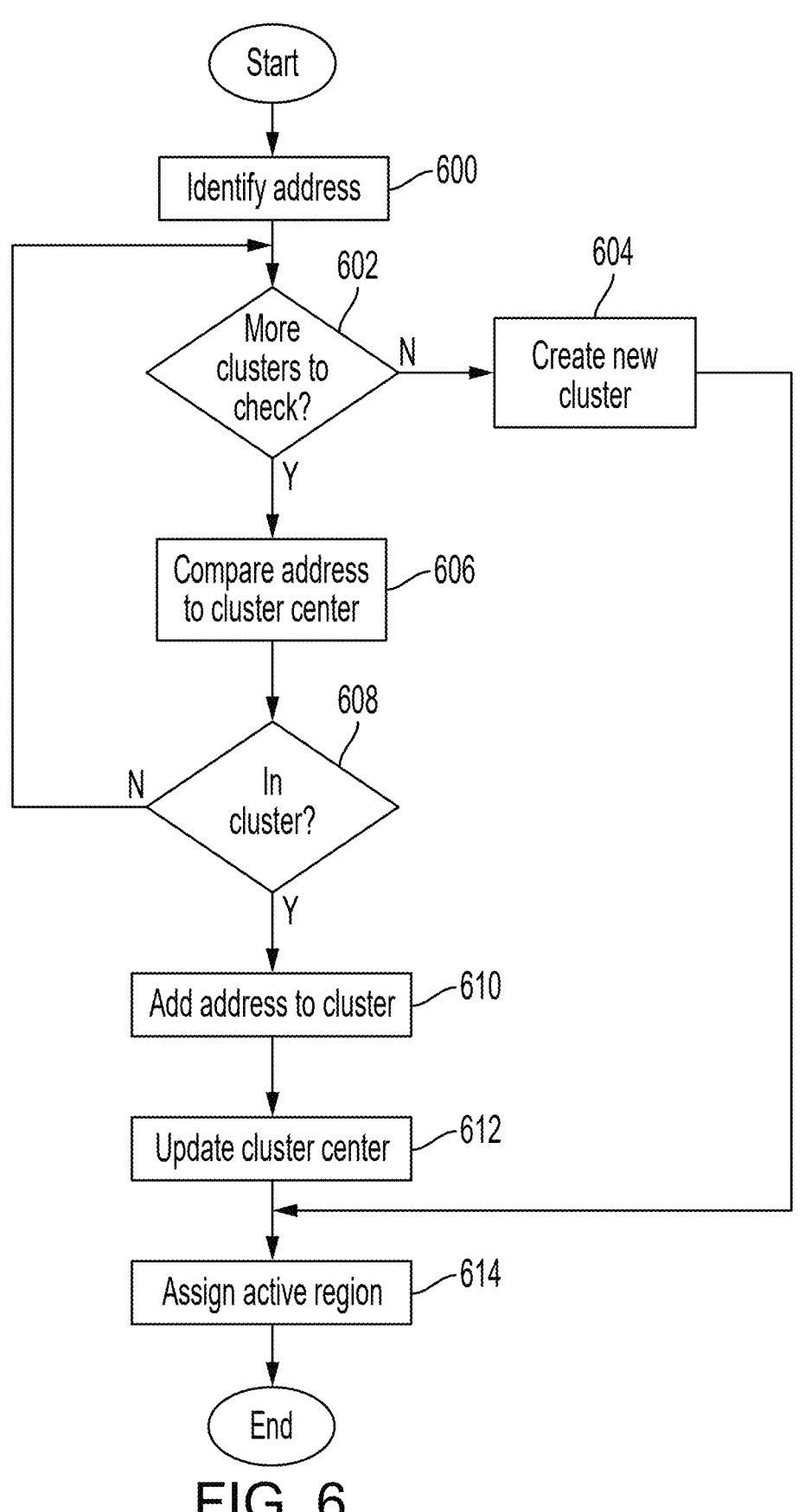
FIG. 6 depicts a flow diagram of a process for assigning an address to a cluster according to one or more embodiments.

FIG. 6 depicts a flow diagram of a process for assigning an address to a cluster 400 according to one or more embodiments. The process starts, and in act 600, the clustering engine 300 identifies an address of a data access request.

In act 602, the clustering engine 300 determines whether there are existing clusters 400 that need to be checked for determining whether the address should be added to an existing cluster. If the answer is NO, a new cluster 400 is generated in act 604. The cluster 400 may be of a preset size centered around the address.

If, however, there are clusters that need to be checked, the address is compared, in act 606, against a cluster center (e.g., center address 412), and a determination is made in act 608, as to whether the address is within the boundaries of the cluster 400. For example, a difference between the address and the cluster center address may be computed, and a determination may be made as to whether the difference is within a maximum distance from the cluster center. For example, if the cluster size is 8 GB, the maximum distance may be 4 GB from the cluster center.

If the address is within the cluster 400, the clustering engine 300 adds the address to the cluster 400 in act 610.

In act 612, the clustering engine 300 updates the center address of the cluster 400. The new center address may be an average of the added address and previously accessed addresses that have already been associated to the cluster.

Figure 7:
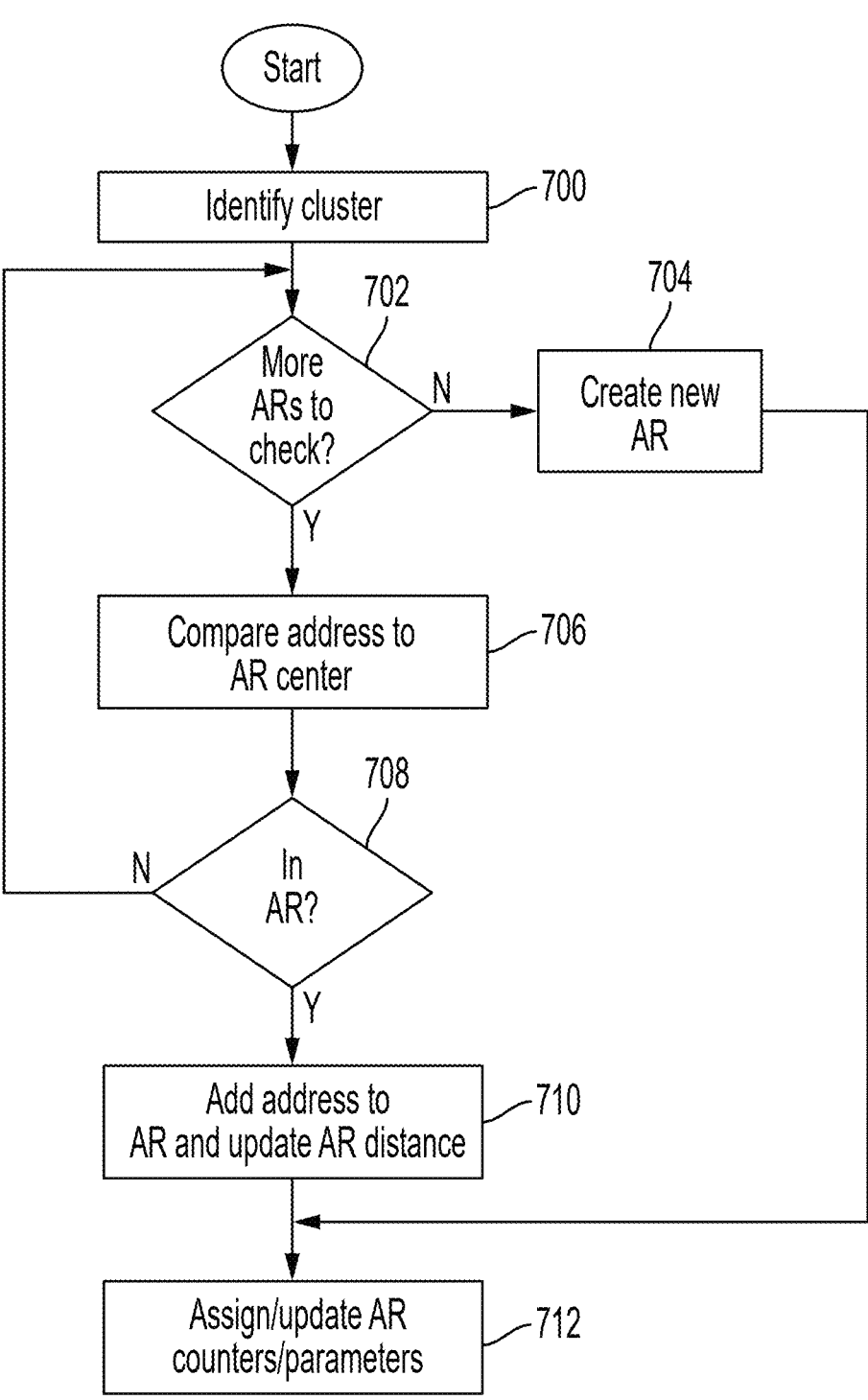
FIG. 7 depicts a block diagram of a process for assigning an address to an active region according to one or more embodiments.

In act 614, the clustering engine 300 assigns the address to an active region as discussed in further detail with respect to FIG. 7.

FIG. 7 depicts a block diagram of a process of act 614 for assigning an address to an active region 402 according to one or more embodiments. The process starts, and in act 700, the cluster assigned to the address is identified.

In act 702, a determination is made as to whether there are existing active regions 402 to which the address could be added. If the answer is NO, a new active region 402 is created in act 704.

If there are exiting active region to which the address could be added, the address is compared, in act 706, against an AR center, and a determination is made in act 708 as to whether the address is within the boundaries of the active region (referred to as an AR distance) 402. For example, a difference between the address and the AR center address may be computed, and a determination may be made as to whether the difference is within a maximum distance from the AR center.

If the address is within the active region 402, the clustering engine 300 adds the address to the active region in act 710, and updates the AR distance to be the difference between the address and the AR center address.

In act 712, one or more counters and/or parameter values associated with the active region are updated. For example, an access counter for the cluster and active region may be increased, an access time may be updated, and/or a miss or hit counter may be updated based on whether the access to the address resulted in a cache miss or hit.

Figure 8:
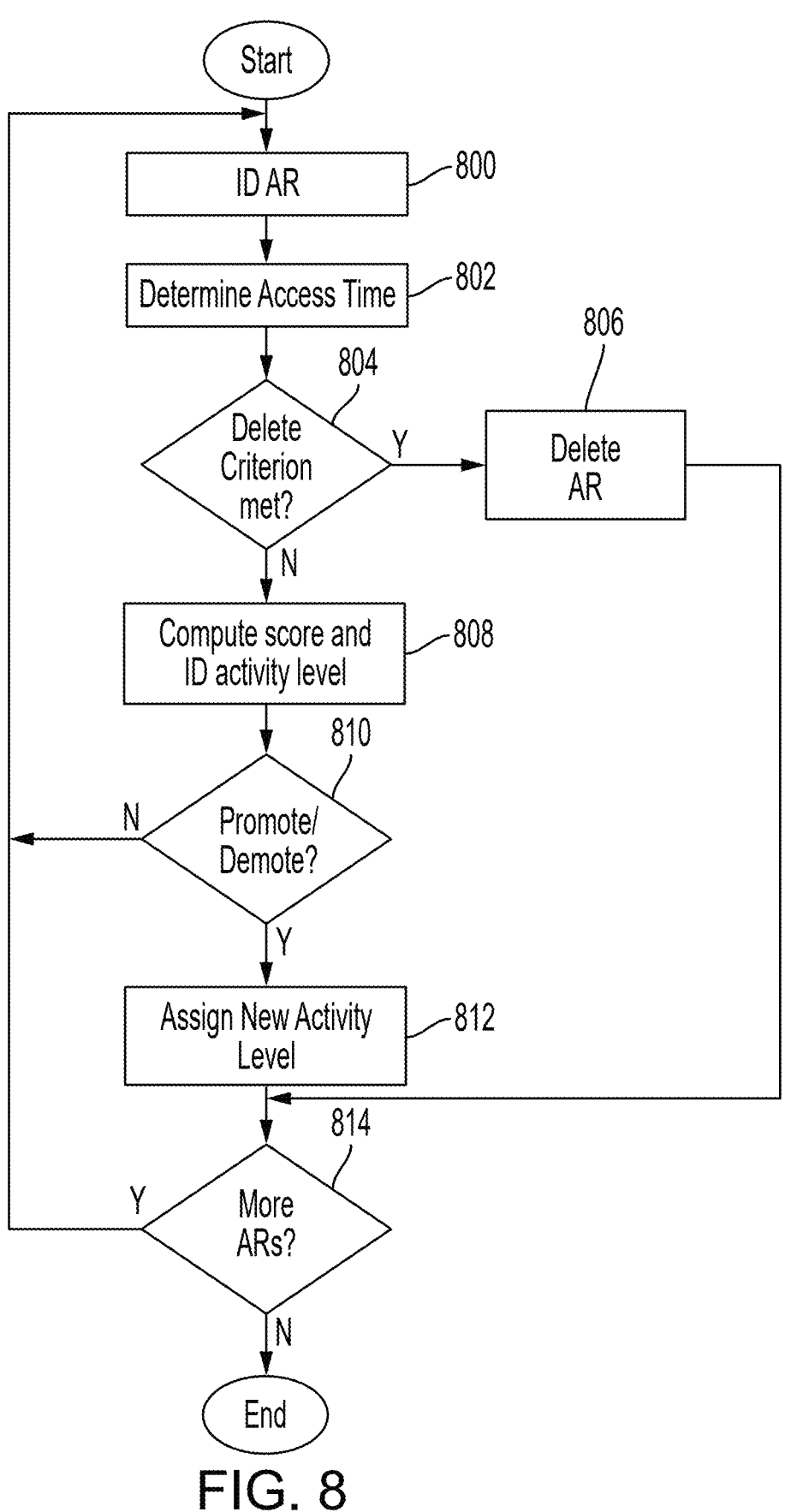
FIG. 8 depicts a flow diagram of a process for evaluating active regions according to one or more embodiments.

FIG. 8 depicts a flow diagram of a process for evaluating active regions 402 according to one or more embodiments. The evaluation may be performed in response to the evaluation engine 304 detecting a trigger or condition. The trigger may be, for example, detecting the threshold number (e.g., 5000) of memory accesses, detecting a certain passage of time since a last evaluation, detecting a status of the memory device, and/or the like.

In act 800, the evaluation engine 304 identifies an active region 402 that is to be evaluated.

In act 802, the evaluation engine 304 determines a time of an access (e.g., a last access) of an address associated with the active region 402.

In act 804, a determination is made as to whether a criterion for deleting the active region 402 has been satisfied. The criterion may be, for example, that no memory addresses of the active region have been accessed for a certain number (e.g., three) evaluation rounds.

If the criterion has been detected, the active region 402 is deleted in act 806. In some embodiments, if no other active regions exist in the corresponding cluster, the cluster is also deleted.

If the criterion for deletion has not been detected, a score is computed in act 808. The score may be computed based on calculations performed using the counter values. For example, the score may be a weighted aggregate of the population of the corresponding cluster, the population of the active region 402, the miss ratio in the active region, and a last access time ratio.

In act 810, a determination is made as to whether the active region 402 should be promoted or demoted from a current activity level based on the computed score. An activity level may be associated with a threshold score that is to be satisfied prior to an active region being assigned the activity level. An active region 402 having a first activity level may be promoted to a higher activity level if the score of the active region is at or above the threshold score associated with the higher activity level. An active region 402 having a first activity level may be demoted to a lower activity level if the score of the active region is at or below the threshold score associated with the lower activity level.

In act 812 the evaluation engine 304 assigns to the active region the activity level that corresponds to the computed score. In some embodiments, an active region 402 with a sufficiently high activity level (e.g., activity level 3) may be split into one or more regions. For example, an active region of a size of 32 MB that is assigned to the high activity level may be split into two active regions of size 16 MB each, where each split active region may be associated with the high activity level. The splitting of the active region may provide additional (e.g., double) credit for accessing the device cache memory 204.

In act 814, a determination is made as to whether there are more active regions 402 to evaluate. If the answer is YES, the evaluation process returns to act 800 for evaluating the other active regions.

Figure 9:
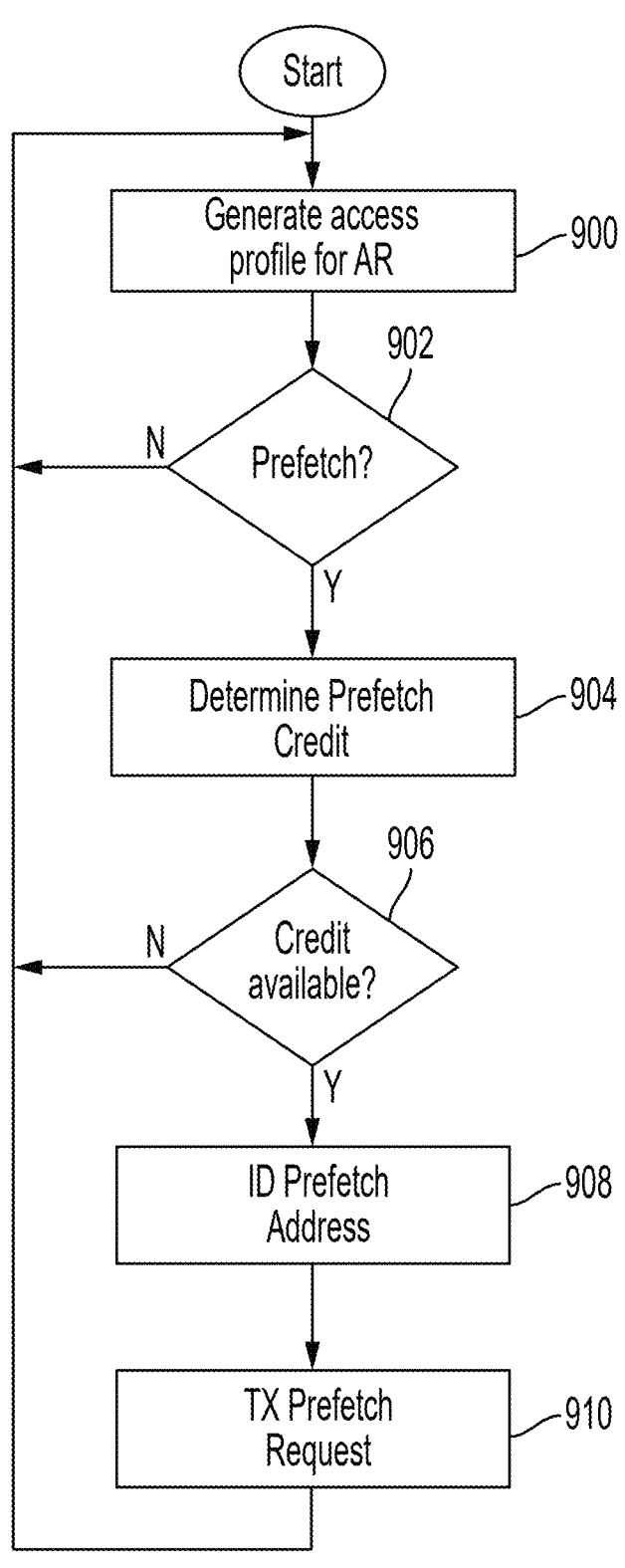
FIG. 9 depicts a flow diagram of a prefetching process according to one or more embodiments.

FIG. 9 depicts a flow diagram of a prefetching process according to one or more embodiments. The process starts, and in act 900, the profiling engine 302 generates an access profile for an active region.

In act 902, the prefetch engine 212 determines whether the access profile for the active region 402 calls for a prefetching action. For example, prefetching may be warranted if the access profile indicates that the accesses are continuous or sequential, that the accesses have a pattern, that the accesses are random jumps to a hot sub-region of the active region, and/or the like.

If prefetching is warranted, the prefetch engine 212 determines, in act 904, an amount of prefetching allowance or credit for the active region 402. The amount of credit may be based on the activity level assigned to the active region 402. In some embodiments, the higher the activity level, the higher the amount of credit, up to a maximum activity level and credit.

In act 906, a determination is made as to whether prefetching credits are available for the active region 402. If the answer is NO, the prefetch engine 212 refrains from transmitting a prefetch request to the cache controller 210. If the answer is YES, the prefetch engine 212 identifies, in act 908, one or more prefetch addresses based on the access profile.

In act 910, the prefetch engine 212 transmits a prefetch command to the cache controller 210. In some embodiments, the cache controller 210 processes the prefetch command based on available capacity of the device cache memory 204. If space is available in the device cache memory the requested prefetch addresses may be prefetched from the NVM 206 to the memory 204. If space is not available in the device cache memory, data may be evicted from the memory prior to fulfilling the prefetch command.

Figure 10:
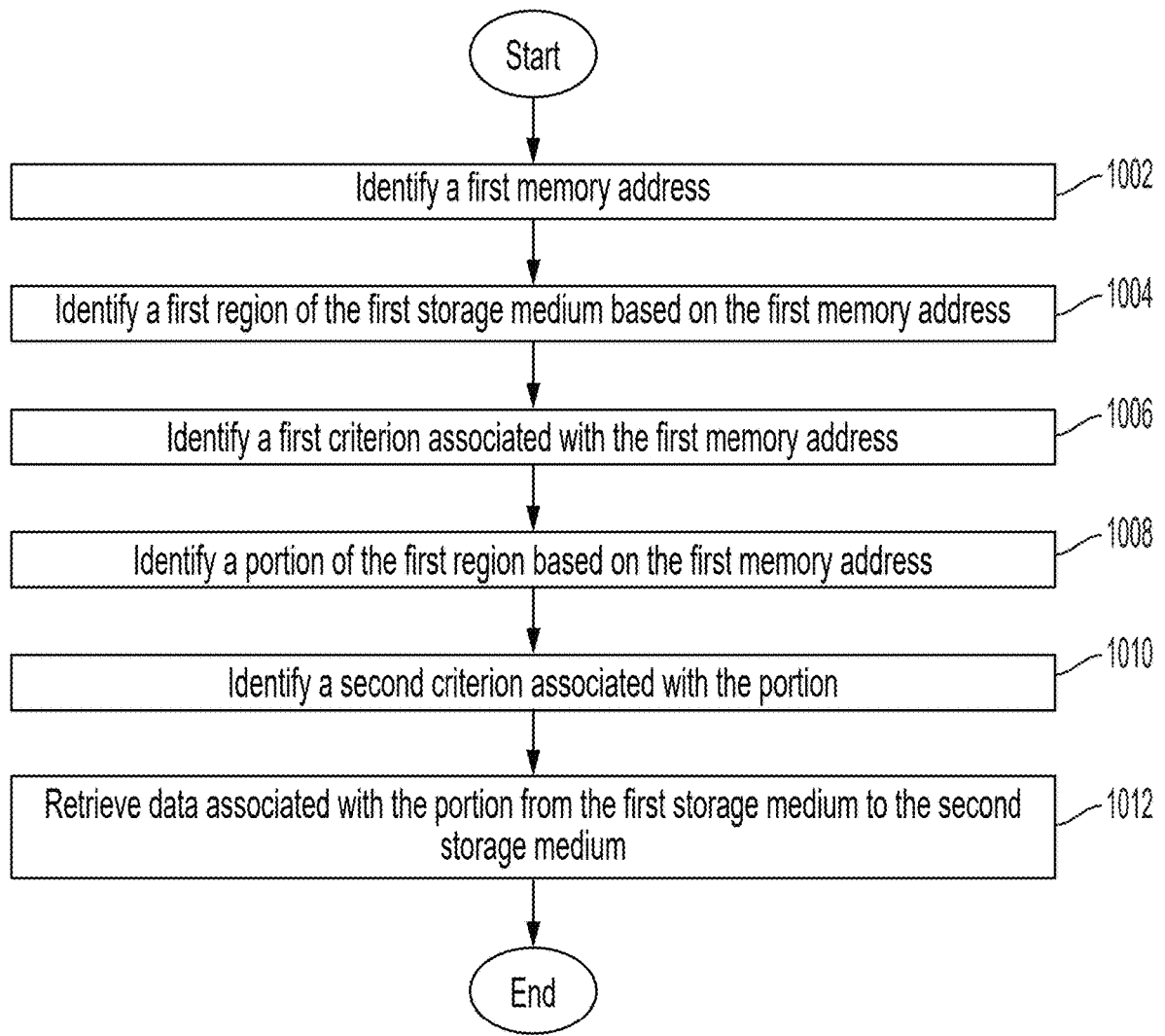
FIG. 10 depicts a flow diagram of a process for detecting a hot region within an active region according to one or more embodiments.

FIG. 10 depicts a flow diagram of a process for detecting a hot region within an active region according to one or more embodiments. The process starts, and in act 1002, the profiling engine 302 (e.g., the hot region recommender 306) identifies a first memory address that is accessed by an application running on the host 100.

In act 1004, the profiling engine 302 identifies an active region (e.g., a first region) of the NVM 206 (e.g., the first storage medium) based on the first address. For example, the active region associated with the first address may be identified based on computing a difference between the first memory address and an address of the center of the active region.

In act 1006, the profiling engine 302 identifies a first criterion associated with the first memory address. The first criterion may be that the access of the first memory address is a jump to the address. A jump may be detected if the accessed first memory address is at least a threshold distance away from a last memory address accessed by the application.

In act 1008, the profiling engine 302 identifies a sub-region (e.g., a portion) of the active region (e.g., the first region) based on the first memory address. In some embodiments, the sub-region is associated with a range of memory addresses (e.g., a range of pages) that is a subset of the range of memory addresses associated with the active region.

In act 1010, the profiling engine 302 identifies a second criterion associated with the sub-region. The second criterion may be determined based on monitoring access to addresses associated with the sub-region. In some embodiments, the second criterion is satisfied if the number of accesses associated with the sub-region is greater than a minimum number of accesses. In some embodiments, the sub-region is promoted as a hot region based on the second criterion being satisfied.

In the event that the sub-region is promoted to a hot region and sufficient prefetch credits exist for the active region, the prefetch engine 212 retrieves (e.g., prefetches), in act 1012, data associated with the sub-region. In some embodiments, the data may be prefetched from the first storage medium (e.g., the NVM 206) to a second storage medium (e.g., cache memory 204). In some embodiments, the prefetch engine 212 prefetches data for a range of page addresses starting from the biggest page address accessed within the sub-region, and ending with the smallest page address accessed within the sub-region.

Figure 11:
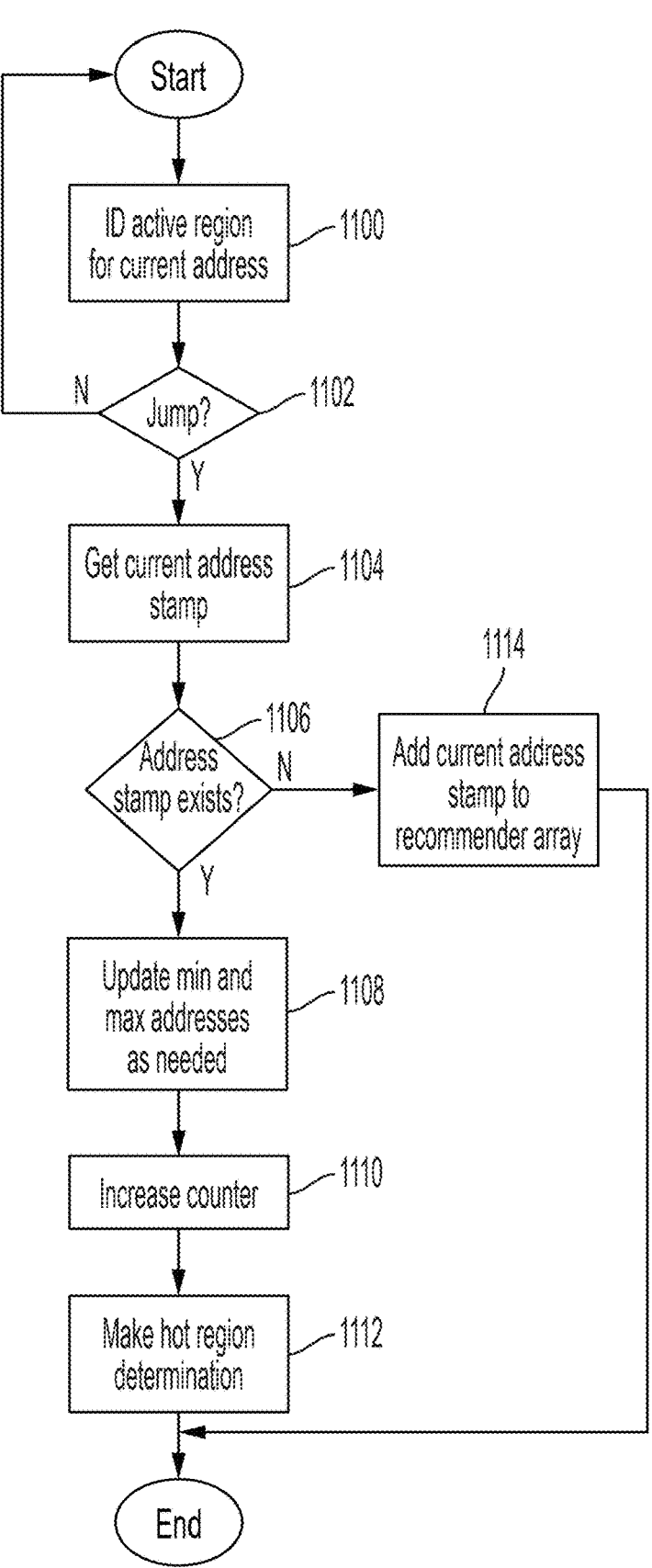
FIG. 11 depicts another flow diagram of a process for detecting a hot region within an active region according to one or more embodiments.

FIG. 11 depicts another flow diagram of a process for detecting a hot region within an active region according to one or more embodiments. The process starts, and in act 1100, the profiling engine 302 (e.g., the hot region recommender 306) identifies an active region for a current address (e.g., an address accessed by an application running on the host 100).

In act 1102, a determination is made as to whether the access is a jump to the current address.

If the answer is YES, the hot region recommender 306 identifies a current sub-region for the current address. In this regard, the hot region recommender identifies, in act 1104 a current address stamp for the current address. In some embodiments, the current address stamp may be associated with a range of pages (e.g., 32 pages) that define the sub-region. In some embodiments, the current address stamp may be identified based on one or more most significant bits of the current address.

In act 1106, the hot region recommender 306 determines if there is already a sub-region associated with the current address stamp in the sub-region recommender array. If there is no match, the current sub-region is added to the sub-region recommender array. In this regard, the host region recommender 306 adds the current address stamp to the sub-region recommender array in act 1114. In some embodiments, the current address stamp is added to the top of the array (e.g., at index 0). In the event that the array already contains a maximum number of sub-regions (e.g., 5 sub-regions), the sub-region that has not been accessed the longest (e.g., the region at the bottom of the array) is deleted in order to make room for the sub-region associated with the current address stamp.

In some embodiments, the maximum and minimum address parameters for the added sub-region are also initialized. In this regard, the maximum and minimum addresses are initialized to the current address. The jump counter is initialized to a value of 1.

Referring again to act 1106, if there is a match of the current address stamp with an address stamp of an existing sub-region in the sub-region array, the hot region recommender 306 updates, in act 1108, the minimum and maximum address parameters of the identified sub-region as needed. For example, if the current address is smaller than a current smallest page address for the sub-region, the smallest page address is updated to be the current address (e.g., based on one or more least significant bits of the current address). If the current address is bigger than a current biggest page address for the sub-region, the largest page address value is updated to be the current address. A jump counter value for the sub-region is also increased in act 1110.

In act 1112, the hot region recommender 306 makes a hot region determination of the current sub-region. In some embodiments, prefetching is conducted for a sub-region that is determined to be a hot region. The prefetching of pages associated with the sub-region helps minimizes a miss rate due to random jumps to the hot region.

Figure 12:
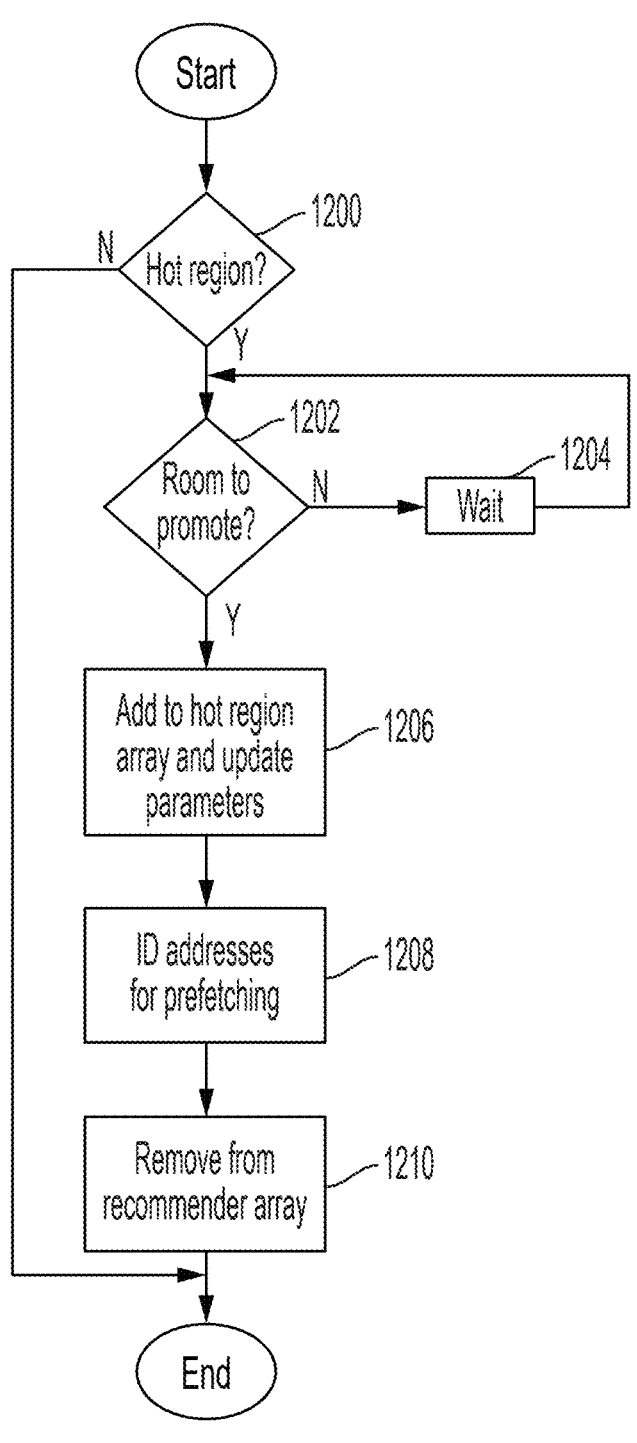
FIG. 12 depicts a block diagram of a process for making a hot region determination for a sub-region according to one or more embodiments.

FIG. 12 depicts a block diagram of a process for making a hot region determination for a sub-region according to one or more embodiments. The process starts, and in act 1200, the hot region recommender 306 determines whether the sub-region has satisfied a criterion for being considered a hot region. In some embodiments, the criterion is satisfied based on determining that the number of jumps to memory addresses associated with the sub-region exceed a threshold value.

If the criterion is satisfied, the hot region recommender 306 determines whether there is room to promote the sub-region as a hot region. For example, the hot region recommender 306 my inspect the hot region array to determine whether a maximum number of hot regions have been stored in the array. If the array is full, the hot region recommender 306 waits, in act 1204, until there is room. For example, the hot region recommender may wait until a current hot region is evicted from the hot region array.

If the answer is YES, and there is room in the hot region array to promote the sub-region as a hot region, the hot region recommender 306 adds the sub-region to the hot region array in act 1206, and initializes parameter values for the added hot region. The parameter values may include, for example, the address stamp of the added hot region (including, for example, the minimum and maximum addresses associated with the hot region), a value of an access counter indicative of a number of accesses to the hot region, and a hits counter indicative of a number of accesses to the hot region that resulted in a hit. In some embodiments, a time stamp of the latest access to the hot region is also maintained.

In act 1208, the hot region recommender 306 identifies addresses for the added hot region that are to be prefetched. For example, the hot region recommender 306 may identify addresses between the smallest and biggest page addresses accessed for the added hot region, and submit a command to the prefetch engine 212 for prefetching data for the identified addresses.

In act 1210, the hot region recommender 306 removes the sub-region that is added to the hot region array, from the sub-region recommender array.

Figure 13:
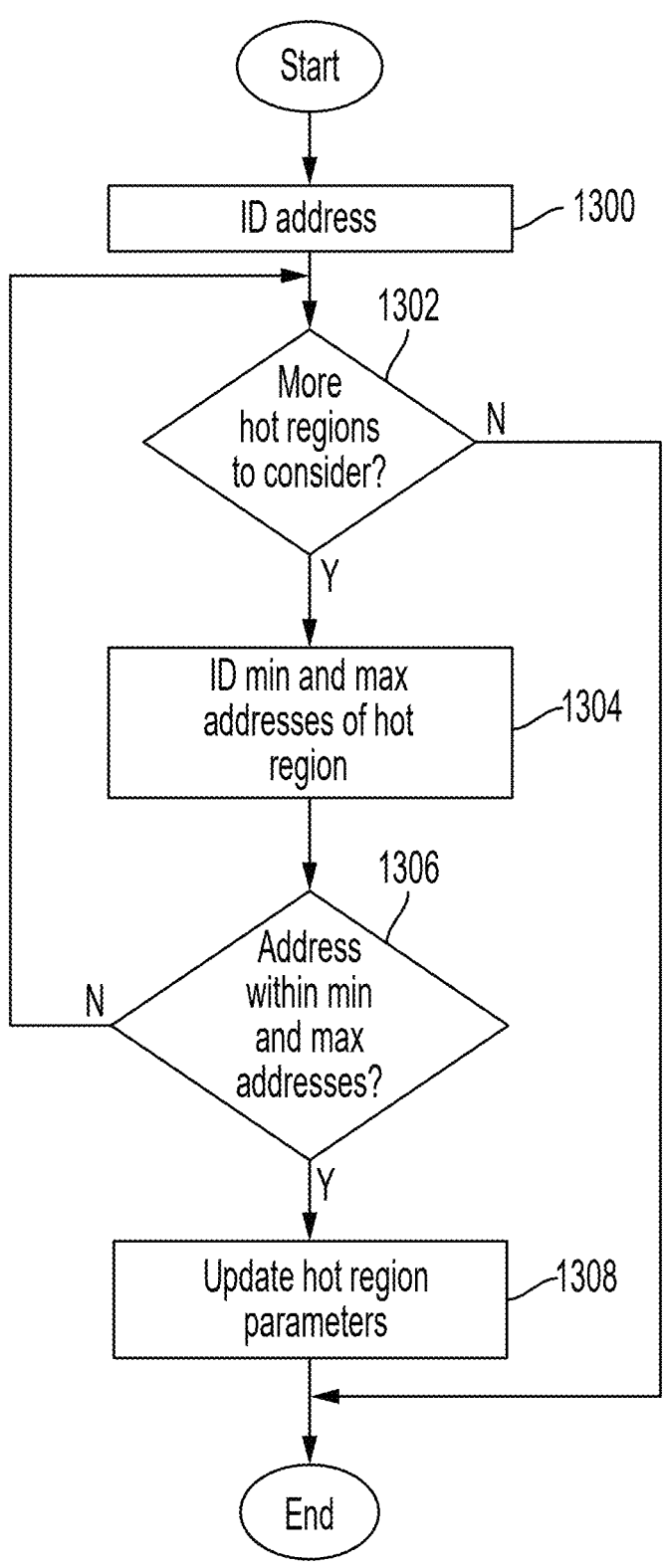
FIG. 13 depicts a flow diagram of a process for monitoring access of a hot region according to one or more embodiments.

FIG. 13 depicts a flow diagram of a process for monitoring access of a hot region according to one or more embodiments. The process begins, and in act 1300, the hot region evaluator 308 identifies an address of a current access (e.g., a load access) by an application running on the host 100.

In act 1302, a determination is made as to whether there are any more hot regions to consider for determining whether the current access is directed to a hot region. If the answer is YES, the hot region evaluator 308 identifies the minimum and maximum addresses (e.g., based on the minimum and maximum address parameters) that have been accessed for the hot region being considered.

In act 1306, a determination is made as to whether the current address is within the minimum and maximum addresses. If the answer is NO, a next hot region is considered in act 1302.

If the answer is YES, the access is for the hot region being considered, and the parameters of the hot region are updated based on the access. For example, the access counter (and a time of the access) for the hot region may be increased. The hits counter may also be increased if the access resulted in a cache hit.

Figure 14:
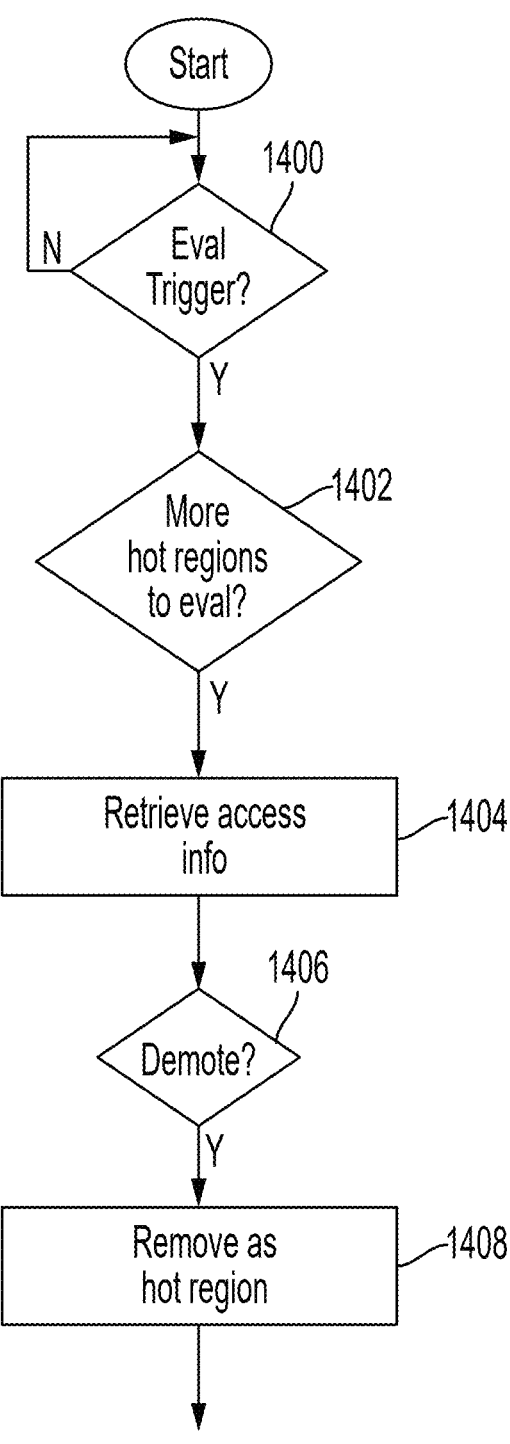
FIG. 14 depicts a flow diagram of a process for evaluating hot regions in the hot region array according to one or more embodiments.

FIG. 14 depicts a flow diagram of a process for evaluating hot regions in the hot region array according to one or more embodiments. The evaluation may be conducted on a periodic (regular or irregular) basis for determining whether a hot region should continue maintaining its status as a hot region, or be demoted to a regular (non-hot region) status.

The process begins, and in act 1400, the hot region evaluator 308 determines whether a trigger or condition for conducting an evaluation of the hot regions has been detected. The trigger may be, for example, passage of a certain amount of time from the last evaluation, a number of sub-regions waiting for promotion to a hot region, and/or the like.

If the trigger for conducting the evaluation has been detected, the hot region evaluator 308 determines, in act 1402, whether there are more hot regions in the hot region array that need to be evaluated.

If the answer is YES, the hot region evaluator retrieves, in act 1404, the access counter associated with the hot region.

In act 1406, a determination is made as to whether the hot region should be demoted. In this regard, a time of a last access to the hot region is retrieved for determining the amount of time that has elapsed since the last access. For example, the hot region may be selected for demotion if the hot region has not been accessed since the last evaluation period.

In some embodiments, the hot region is selected for demotion based on a number of accesses tracked by the access counter. For example, if the number of accesses of the hot region is below a threshold value, the hot region may be selected for demotion.

In some embodiments, a weighted number of accesses to the hot region is compared against a weighted number of accesses to a sub-region waiting to be promoted as a hot region. If the weighted number of accesses to the sub-region is higher than the number of accesses to the hot region, the hot region may be selected for demotion to make room for the sub-region.

In some embodiments, a hit counter of the hot region is compared against a minimum threshold value. The hot region may be selected for demotion if the number of hits detected by the hit counter is lower than the minimum threshold value.

If the hot region is selected for demotion, the hot region is evicted (e.g., removed) from the hot region array in act 1408.

Figure 15:
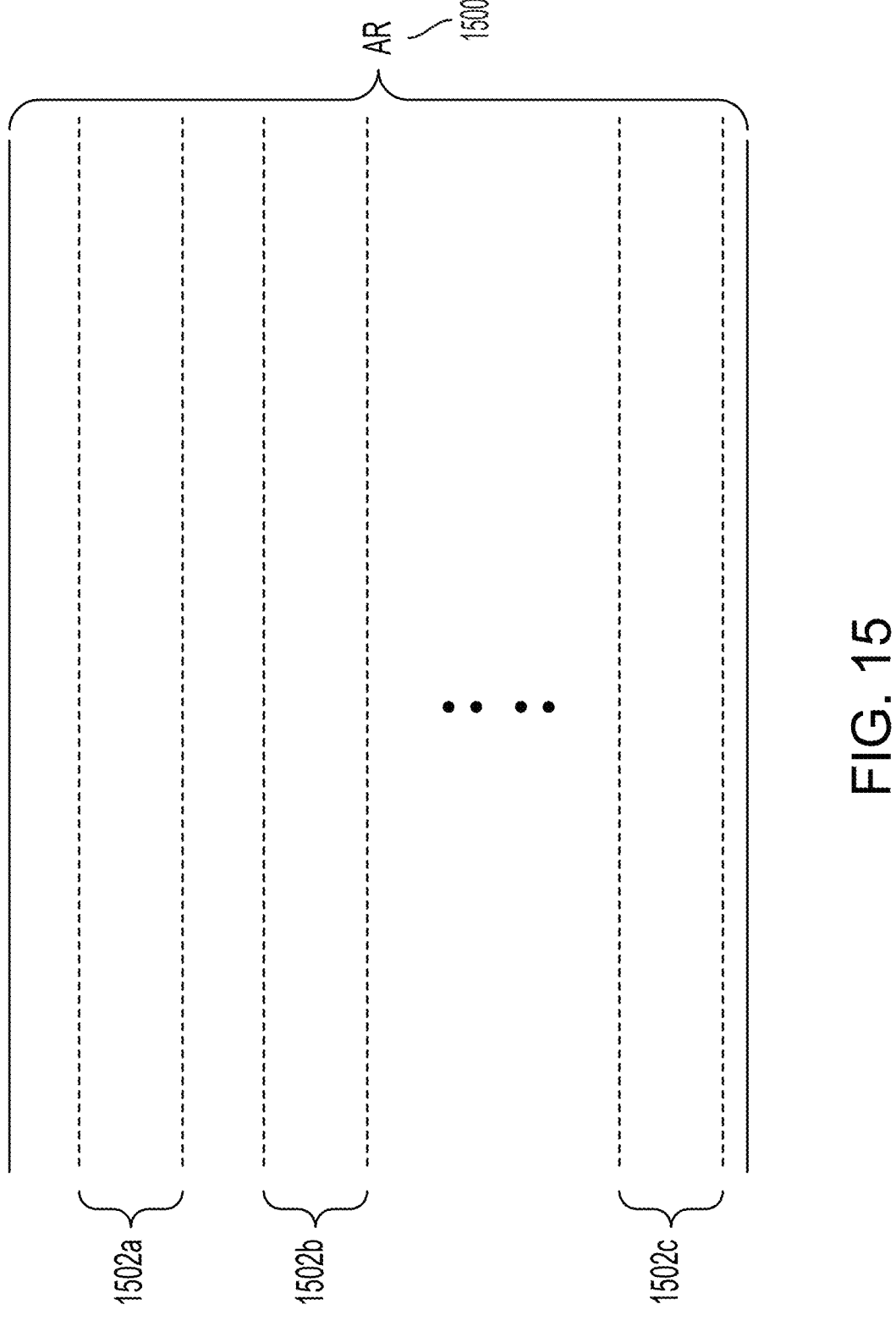
FIG. 15 depicts a conceptual layout diagram of an active region including one or more sub-regions identified in response to detecting a jump to an address associated with the sub-region according to one or more embodiments.

FIG. 15 depicts a conceptual layout diagram of an active region 1500 including one or more sub-regions 1502a-1502c (collectively referenced as 1502) identified in response to detecting a jump to an address associated with the sub-region according to one or more embodiments. A first one of the sub-regions 1502a may be defined by a first address stamp associated with a first range of pages, and a second one of the sub-regions 1502b may be defined by a second address stamp associated with a second range of pages different from the first range.

In some embodiments, the number of sub-regions 1502 that may be identified for an active region 1500 is preset. For example, up to five sub-regions 1502 may be identified for an active region 1500. The access of a memory address associated with the one or more sub-regions 1502 may be monitored for determining whether the sub-region should be promoted to a hot region.

Figure 16:
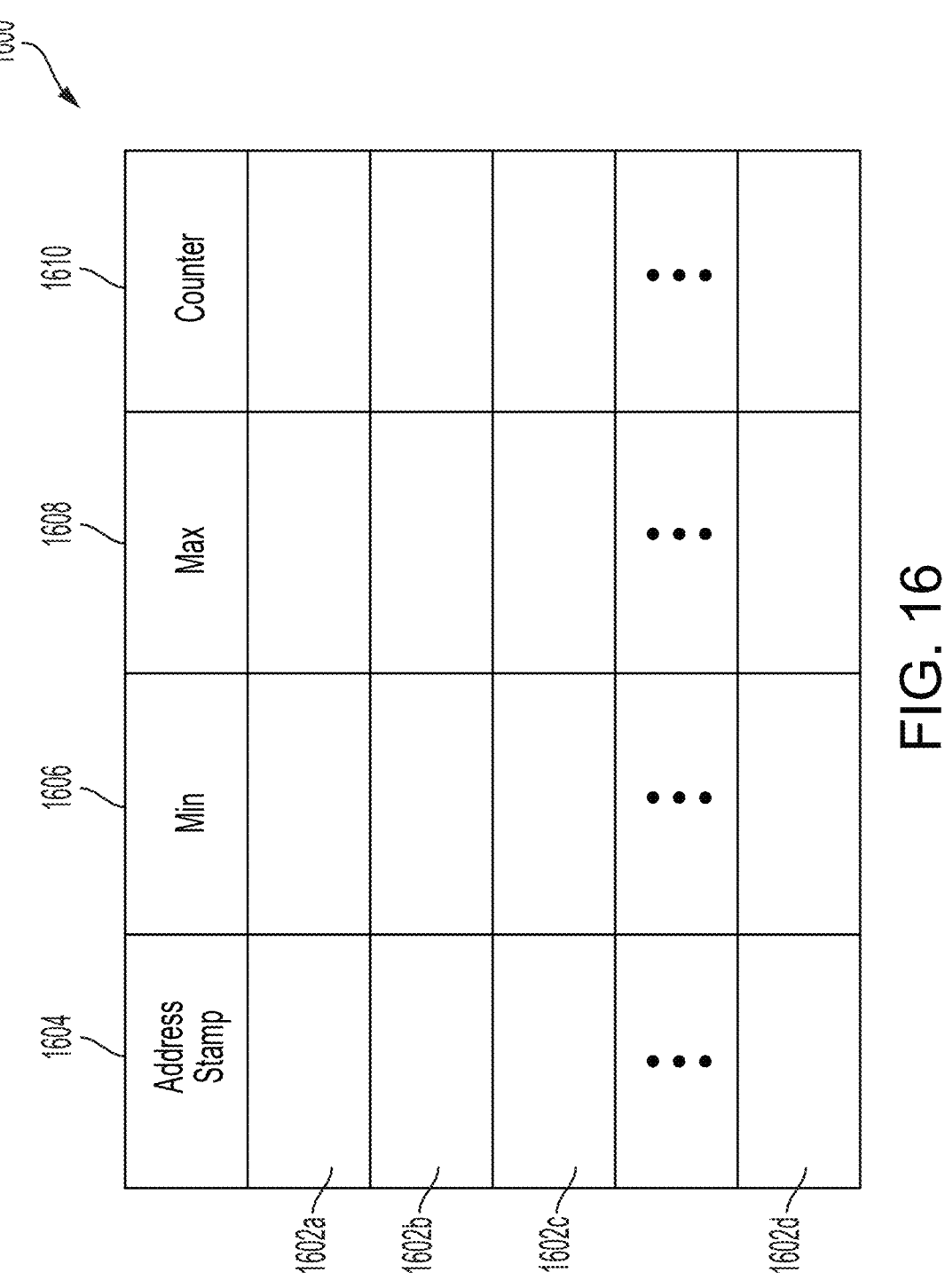
FIG. 16 depicts an exemplary sub-region recommender array 1600 according to one or more embodiments.

FIG. 16 depicts an exemplary sub-region recommender array 1600 according to one or more embodiments. The array 1600 may include up to n number of rows 1602a-1602d (collectively referenced as 1602) associated with n number of sub-regions 1502 that may be identified and monitored for an active region 1500 according to one or more embodiments.

The array 1600 may include one or more columns for storing parameters of the sub-regions corresponding to the rows 1602. In some embodiments, a first column may store an address stamp 1604 representing the range of pages for the sub-regions. A second column may store a minimum address 1606 that has been accessed for the range of pages for the corresponding sub-regions. A third column may store a maximum address 1608 that has been accessed for the range of pages for the corresponding sub-regions. A fourth column may store a jump counter 1610 of jumps detected for the range of pages for the corresponding sub-regions.

In some embodiments, the hot region recommender 306 is configured to update the sub-region minimum address 1606, maximum address 1608, and/or jump counter 1610 when a jump to an address associated with the corresponding address stamp 1604 is detected. In some embodiments, a sub-region associated with a most recently accessed address is stored in a first row 1602a of the array 1600, and the remaining rows 1602b-1602e are shifted into subsequent row positions. In some embodiments, when a new sub-region is added to an array that already stores n number of sub-regions, the sub-region associated with the last row 1602e is deleted to make room for the new sub-region.

Figure 17:
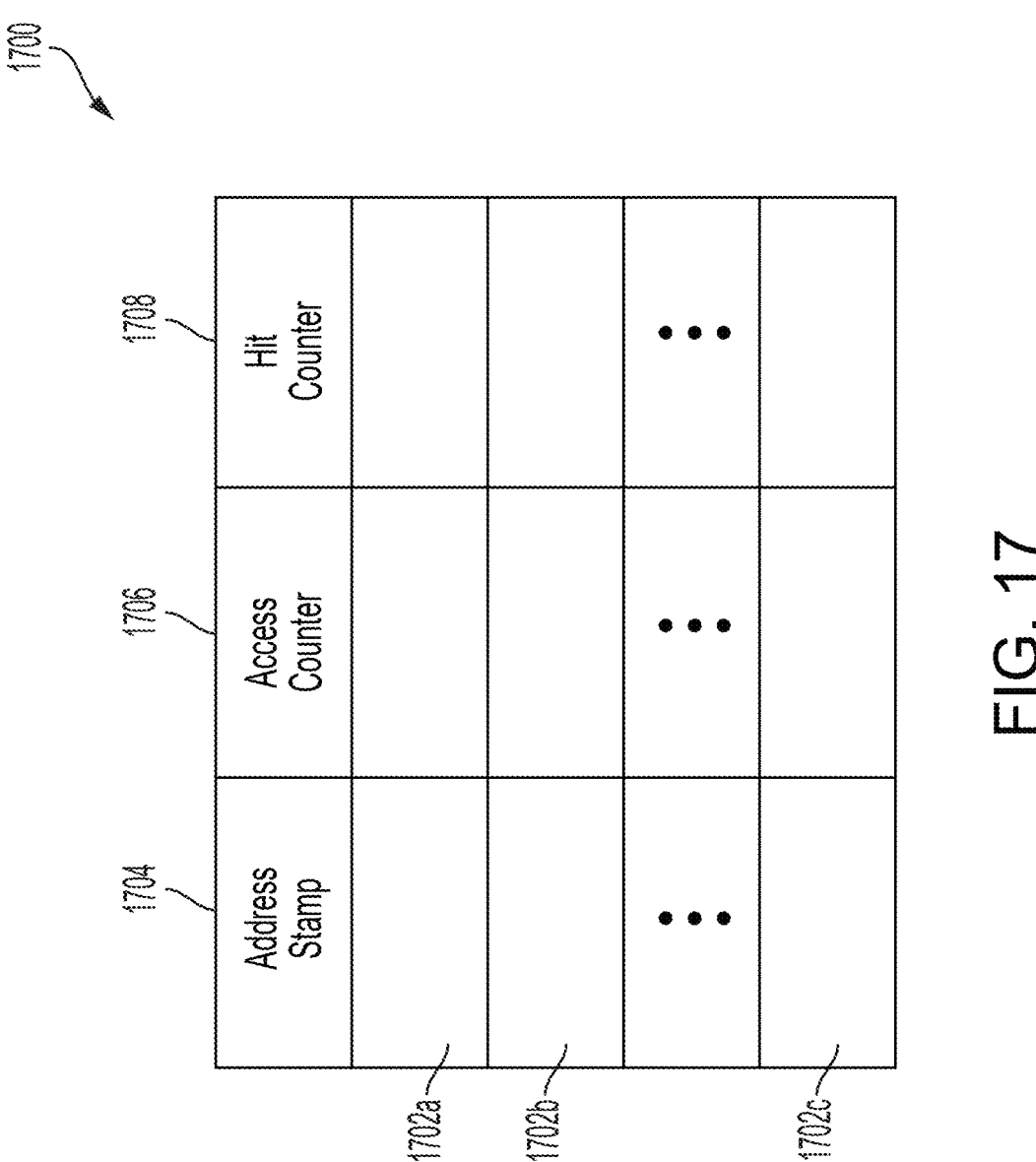
FIG. 17 depicts an exemplary hot region array 1700 according to one or more embodiments.

FIG. 17 depicts an exemplary hot region array 1700 according to one or more embodiments. The array 1700 may include up to m number of rows 1702a-1702c (collectively referenced as 1702) associated with m hot regions identified for one or more active regions of the one or more clusters.

The hot region array 1700 may include one or more columns for storing parameters of the hot regions corresponding to the rows 1702. In some embodiments, a first column may store an address stamp 1704 of the corresponding hot region (including minimum and maximum addresses associated with the address stamp). A second column may store an access counter 1706 of accesses to the corresponding hot region. A third column may store a hits counter 1708 of a number accesses to the corresponding hot region that have resulted in a cache hit.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for pattern recognition have been specifically described and illustrated herein, many modifications and variations will be apparent to those skilled in the art. Accordingly, it is to be understood that systems and methods for pattern recognition according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A storage device comprising: a first storage medium; a second storage medium; a processor configured to: identify a first memory address; identify a first region of the first storage medium based on the first memory address; identify a first criterion associated with the first memory address; based on identification of the first criterion, identify a portion of the first region based on the first memory address; identify a second criterion associated with the portion; and retrieve data associated with the portion from the first storage medium to the second storage medium based on identification of the second criterion.

Statement 2. The storage device of Statement 1, wherein the first criterion includes the first memory address being a threshold distance away from a second memory address.

Statement 3. The storage device of Statement 1, wherein the portion of the first region is associated with a range of memory addresses.

Statement 4. The storage device of Statement 3, wherein the processor is configured to: identify a second memory address of the range of memory addresses satisfying a third criterion; identify a third memory address of the range of memory addresses satisfying a fourth criterion; and retrieve data between the second memory address and the third memory address.

Statement 5. The storage device of Statement 1, wherein the processor is further configured to: update a counter associated with the portion based on access of the first memory address.

Statement 6. The storage device of Statement 5, wherein the second criterion includes the counter being greater than a threshold value.

Statement 7. The storage device of Statement 1, wherein the processor is further configured to: maintain a list of identified portions; determine a number of the identified portions in the list; determine that the number of the identified portions is less than a threshold number; and add the portion to the list based on the number of the identified portions being less than the threshold number.

Statement 8. The storage device of Statement 7, wherein the processor being configured to retrieve the data is based on the portion being added to the list.

Statement 9. The storage device of Statement 7, wherein the processor is further configured to: detect a condition; based on detecting the condition, identify a third criterion associated with the portion; and based on identifying the third criterion, remove the portion from the list.

Statement 10. The storage device of Statement 9, wherein the third criterion is based on an access of an address associated with the portion.

Statement 11. A method comprising: identifying a first memory address;
identifying a first region of a first storage medium based on the first memory address; identifying a first criterion associated with the first memory address; based on identification of the first criterion, identifying a portion of the first region based on the first memory address; identifying a second criterion associated with the portion; and retrieving data associated with the portion from the first storage medium to a second storage medium based on identification of the second criterion.

Statement 12. The method of Statement 11, wherein the first criterion includes the first memory address being a threshold distance away from a second memory address.

Statement 13. The method of Statement 11, wherein the portion of the first region is associated with a range of memory addresses.

Statement 14. The method of Statement 13 further comprising: identifying a second memory address of the range of memory addresses satisfying a third criterion; identifying a third memory address of the range of memory addresses satisfying a fourth criterion; and retrieving data between the second memory address and the third memory address.

Statement 15. The method of Statement 11 further comprising: updating a counter associated with the portion based on access of the first memory address.

Statement 16. The method of Statement 15, wherein the second criterion includes the counter being greater than a threshold value.

Statement 17. The method of Statement 11 further comprising: maintaining a list of identified portions; determining a number of the identified portions in the list; determining that the number of the identified portions is less than a threshold number; and adding the portion to the list based on the number of the identified portions being less than the threshold number.

Statement 18. The method of Statement 17 further comprising retrieving the data based on the portion being added to the list.

Statement 19. The method of Statement 17 further comprising: detecting a condition; based on detecting the condition, identifying a third criterion associated with the portion; and based on identifying the third criterion, removing the portion from the list.

Statement 20. The storage device of Statement 9, wherein the third criterion is based on an access of an address associated with the portion.

What is claimed is:

1. A storage device comprising:
a first storage medium associated with a first access latency;
a second storage medium associated with a second access latency lower than the first access latency;
a processor configured to:
  identify, based on a request from an application, a first physical memory address of the first storage medium;
  identify, based on the request, a first range of physical memory addresses of a first region of the first storage medium based on the first physical memory address;
  identify a second range of physical memory addresses of a portion of the first region based on the first physical memory address;
  identify a number of memory accesses associated with the portion; and
  access the first storage medium over a data interface connection and retrieve data associated with the portion from the first storage medium to the second storage medium based on the number of memory accesses to the portion.

2. The storage device of claim 1, wherein the processor being configured to identify the second range of physical memory addresses is based on the first physical memory address being a threshold distance away from a second memory address.

3. The storage device of claim 1, wherein the processor is configured to:
identify a second memory address of the second range of physical memory addresses satisfying a third criterion;
identify a third memory address of the second range of physical memory addresses satisfying a fourth criterion; and
retrieve data between the second memory address and the third memory address.

4. The storage device of claim 1, wherein the processor is further configured to:
update a counter associated with the portion based on access of the first physical memory address.

5. The storage device of claim 4, wherein the processor being configured to identify the number of memory accesses associated with the portion is based on the counter being greater than a threshold value.

6. The storage device of claim 1, wherein the processor is further configured to:
maintain a list of identified portions;
determine a number of the identified portions in the list;
determine that the number of the identified portions is less than a threshold number; and
add the portion to the list based on the number of the identified portions being less than the threshold number.

7. The storage device of claim 6, wherein the processor being configured to retrieve the data is based on the portion being added to the list.

8. The storage device of claim 6, wherein the processor is further configured to:
detect a condition;
based on detecting the condition, identify a third criterion associated with the portion; and based on identifying the third criterion, remove the portion from the list.

9. The storage device of claim 8, wherein the third criterion is based on an access of an address associated with the portion.

10. A method comprising:
identifying, based on a request from an application, a first physical memory address of a first storage medium;
identifying, based on the request, a first range of physical memory addresses of a first region of a first storage medium based on the first physical memory address;
identifying a second range of physical memory addresses of a portion of the first region based on the first physical memory address;
identifying a number of memory accesses associated with the portion; and
accessing the first storage medium over a data interface connection and retrieving data associated with the portion from the first storage medium to a second storage medium based on the number of memory accesses to the portion, wherein the first storage medium is associated with a first access latency and the second storage medium is associated with a second access latency lower than the first access latency.

11. The method of claim 10, wherein the identifying of the second range of physical memory addresses is based on the first physical memory address being a threshold distance away from a second memory address.

12. The method of claim 10 further comprising:
identifying a second memory address of the second range of physical memory addresses satisfying a third criterion;
identifying a third memory address of the second range of physical memory addresses satisfying a fourth criterion; and
retrieving data between the second memory address and the third memory address.

13. The method of claim 10 further comprising:
updating a counter associated with the portion based on access of the first physical memory address.

14. The method of claim 13, wherein the identifying of the number of memory accesses associated with the portion is based on the counter being greater than a threshold value.

15. The method of claim 10 further comprising:
maintaining a list of identified portions;
determining a number of the identified portions in the list;
determining that the number of the identified portions is less than a threshold number; and
adding the portion to the list based on the number of the identified portions being less than the threshold number.

16. The method of claim 15 further comprising retrieving the data based on the portion being added to the list.

17. The method of claim 15 further comprising:
detecting a condition;
based on detecting the condition, identifying a third criterion associated with the portion; and
based on identifying the third criterion, removing the portion from the list.

18. The method of claim 17, wherein the third criterion is based on an access of an address associated with the portion.

* * * * *